United States Patent
Gajiwala et al.

(10) Patent No.: US 12,204,705 B2
(45) Date of Patent: Jan. 21, 2025

(54) SYSTEM AND METHOD OF MANUFACTURING A THREE- PANEL THERMOPLASTIC FIBERGLASS COMPOSITE HAPTIC TOUCHPAD AND PALM REST ASSEMBLY FOR AN INFORMATION HANDLING SYSTEM

(71) Applicant: Dell Products, LP, Round Rock, TX (US)

(72) Inventors: Priyank J. Gajiwala, Austin, TX (US); Timothy M. Radloff, Austin, TX (US)

(73) Assignee: DELL PRODUCTS LP, Round Rock, TX (US)

( * ) Notice: Subject to any disclaimer, the term of this patent is extended or adjusted under 35 U.S.C. 154(b) by 0 days.

(21) Appl. No.: 18/131,520

(22) Filed: Apr. 6, 2023

(65) Prior Publication Data
US 2024/0338088 A1 Oct. 10, 2024

(51) Int. Cl.
| | |
|---|---|
| *G06F 3/0354* | (2013.01) |
| *G06F 1/16* | (2006.01) |
| *G06F 3/01* | (2006.01) |
| *G06F 3/044* | (2006.01) |

(52) U.S. Cl.
CPC ........ *G06F 3/03547* (2013.01); *G06F 1/1662* (2013.01); *G06F 3/016* (2013.01); *G06F 3/044* (2013.01); *G06F 2203/04103* (2013.01)

(58) Field of Classification Search
CPC .................................................. G06F 3/03547
See application file for complete search history.

(56) References Cited

U.S. PATENT DOCUMENTS

| | | | |
|---|---|---|---|
| 5,920,310 | A | 7/1999 | Faggin |
| 5,952,998 | A | 9/1999 | Clancy |
| 7,804,487 | B1 | 9/2010 | Acampora |
| 8,043,669 | B2 | 10/2011 | Ohno |
| 8,476,355 | B2 | 7/2013 | Ban |
| 9,513,673 | B2 | 12/2016 | Hotelling |
| 9,632,638 | B2 | 4/2017 | Worfolk |
| 10,606,323 | B1 * | 3/2020 | Chang .................. H05K 5/0226 |
| 2010/0141580 | A1 * | 6/2010 | Oh ........................ G06F 3/0338 345/158 |

(Continued)

*Primary Examiner* — Chun-Nan Lin
(74) *Attorney, Agent, or Firm* — Prol Intellectual Property Law, PLLC; H. Kenneth Prol

(57) ABSTRACT

A plural-panel touchpad and palm rest base chassis assembly for an information handling system may comprise a base chassis having an upper portion including a keyboard opening, a touchpad opening for insertion of a touchpad assembly having a touchpad surface panel comprising polycarbonate impregnated thermoplastic fiberglass, and palm rest support surfaces supporting palm rest surface panels. The touchpad surface panel and the palm rest surface panels may have front edges and side edges defining a front and side boundary of the base chassis respectively and also defining the keyboard opening. A lightguide layer may be joined to the touchpad surface panel and to a touchpad printed circuit board assembly (PCBA) to illuminate touch buttons. The touchpad assembly is mechanically and operatively coupled to the base chassis upper portion via top-mounted fasteners disposed through a support bracket to palm rest support surfaces and concealed by the palm rest surface panels.

7 Claims, 17 Drawing Sheets

(56) References Cited

U.S. PATENT DOCUMENTS

| | | |
|---|---|---|
| 2010/0300772 A1 | 12/2010 | Lee |
| 2012/0113009 A1* | 5/2012 | Hotelling ............... G06F 1/169 |
| | | 345/173 |
| 2014/0028564 A1* | 1/2014 | Valentine ............. G06F 3/0213 |
| | | 345/168 |
| 2014/0090990 A1 | 4/2014 | Richardson |
| 2014/0191977 A1* | 7/2014 | Feng .................. G06F 3/04883 |
| | | 345/173 |
| 2018/0218859 A1* | 8/2018 | Ligtenberg ......... H03K 17/9622 |

* cited by examiner

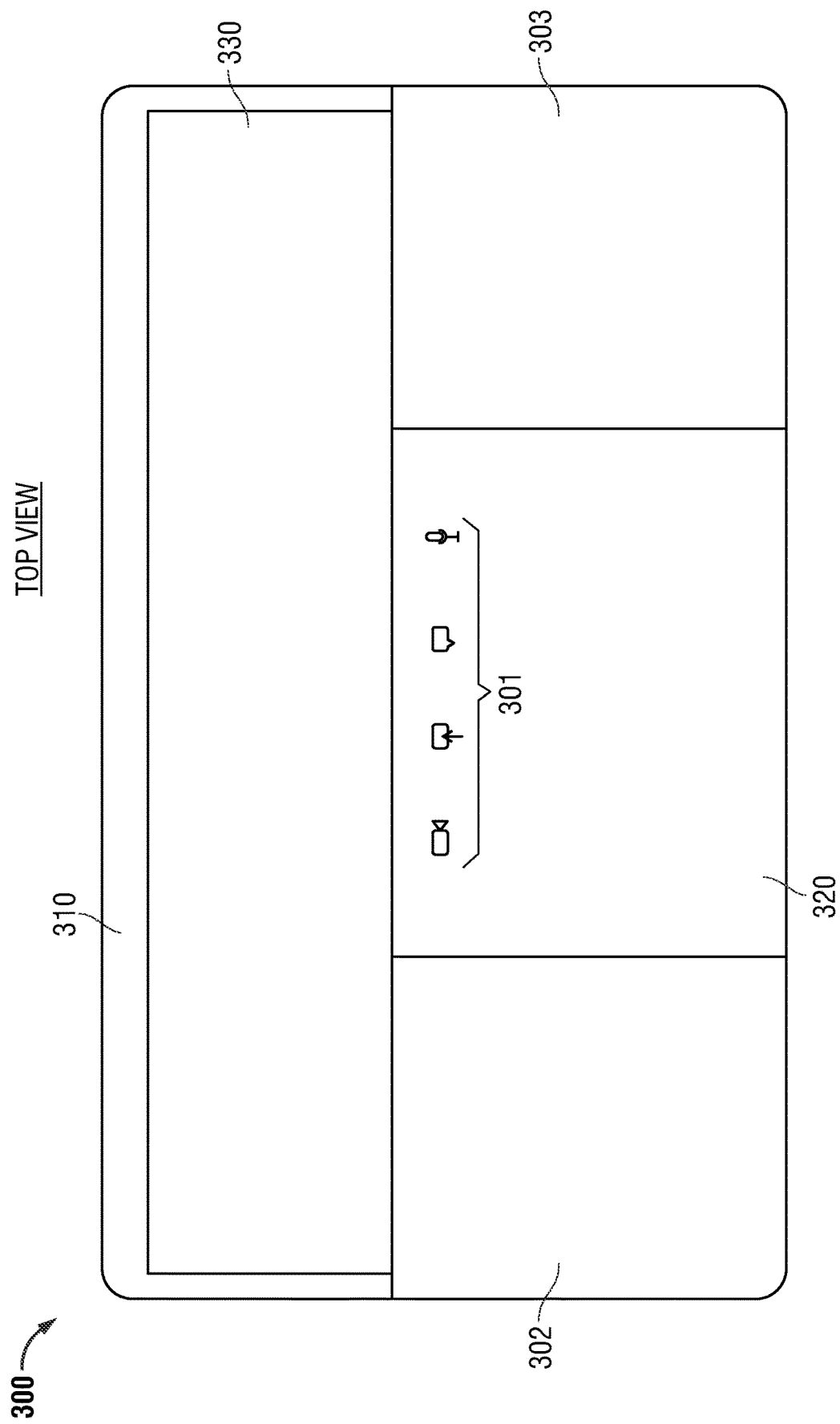

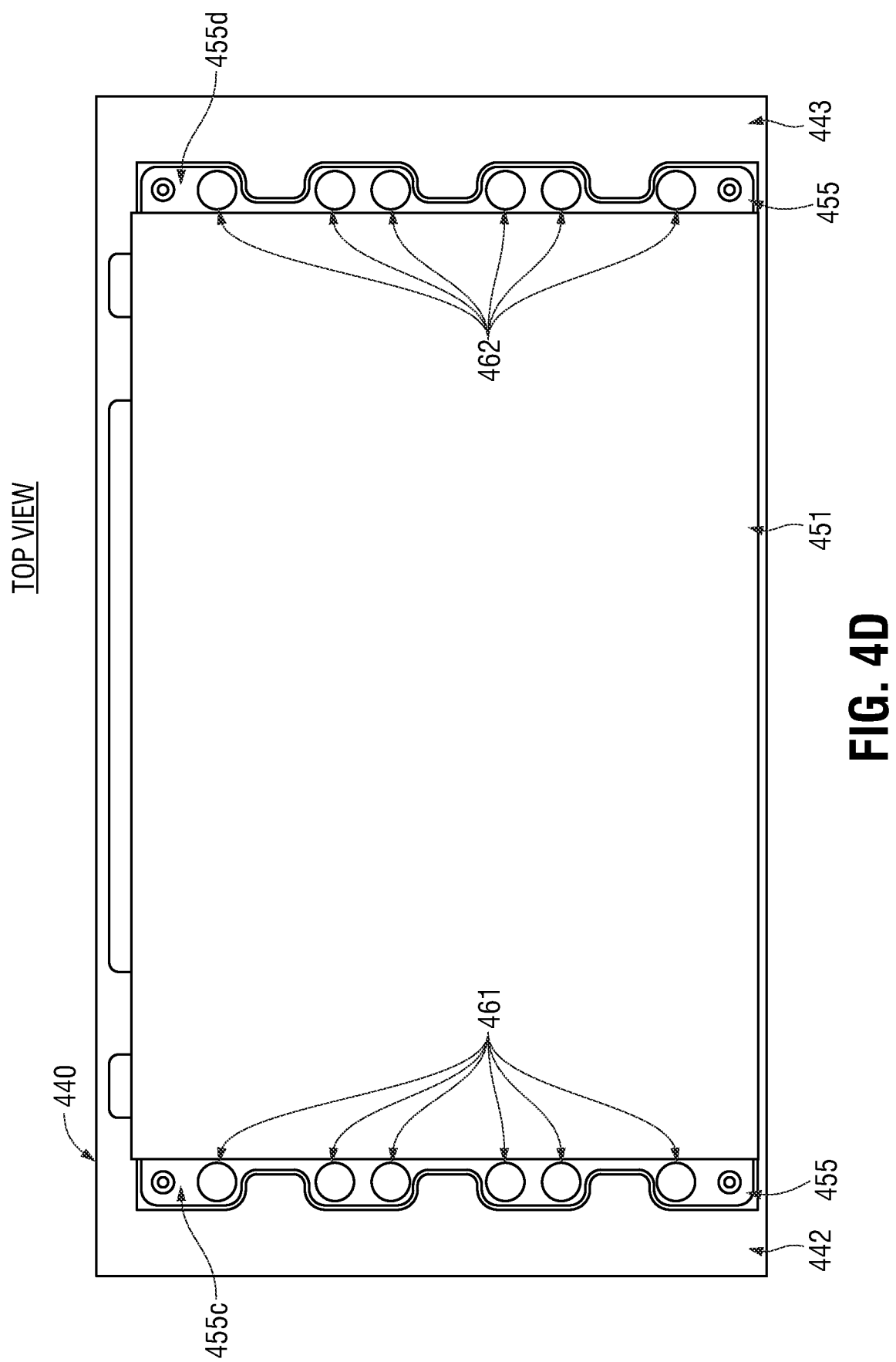

SYSTEM AND METHOD OF MANUFACTURING A THREE- PANEL THERMOPLASTIC FIBERGLASS COMPOSITE HAPTIC TOUCHPAD AND PALM REST ASSEMBLY FOR AN INFORMATION HANDLING SYSTEM

FIELD OF THE DISCLOSURE

The present disclosure generally relates to assembly of a base chassis for an information handling system incorporating a touchpad, keyboard, and palm rests. More specifically, the present disclosure relates to the use of a composite substrate of woven glass fiber impregnated with polycarbonate material for strength and durability as a top surface of a haptic-feedback haptic touchpad assembly that is top-mounted for close alignment with neighboring palm rest surfaces and keyboard, and extends from the keyboard to the front edge of the base chassis of an information handling system.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include one or more input devices incorporated within a base chassis, including a keyboard and touchpad, for example.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which:

FIG. 3 is a graphical diagram illustrating a top view of a three-panel touchpad and palm rest assembly according to an embodiment of the present disclosure;

FIG. 4D is a graphical diagram illustrating a top view of a haptic touchpad assembly mechanically and operatively coupled to a base chassis upper portion via top-mounted fasteners according to an embodiment of the present disclosure;

DETAILED DESCRIPTION OF THE DRAWINGS

Figure 1:
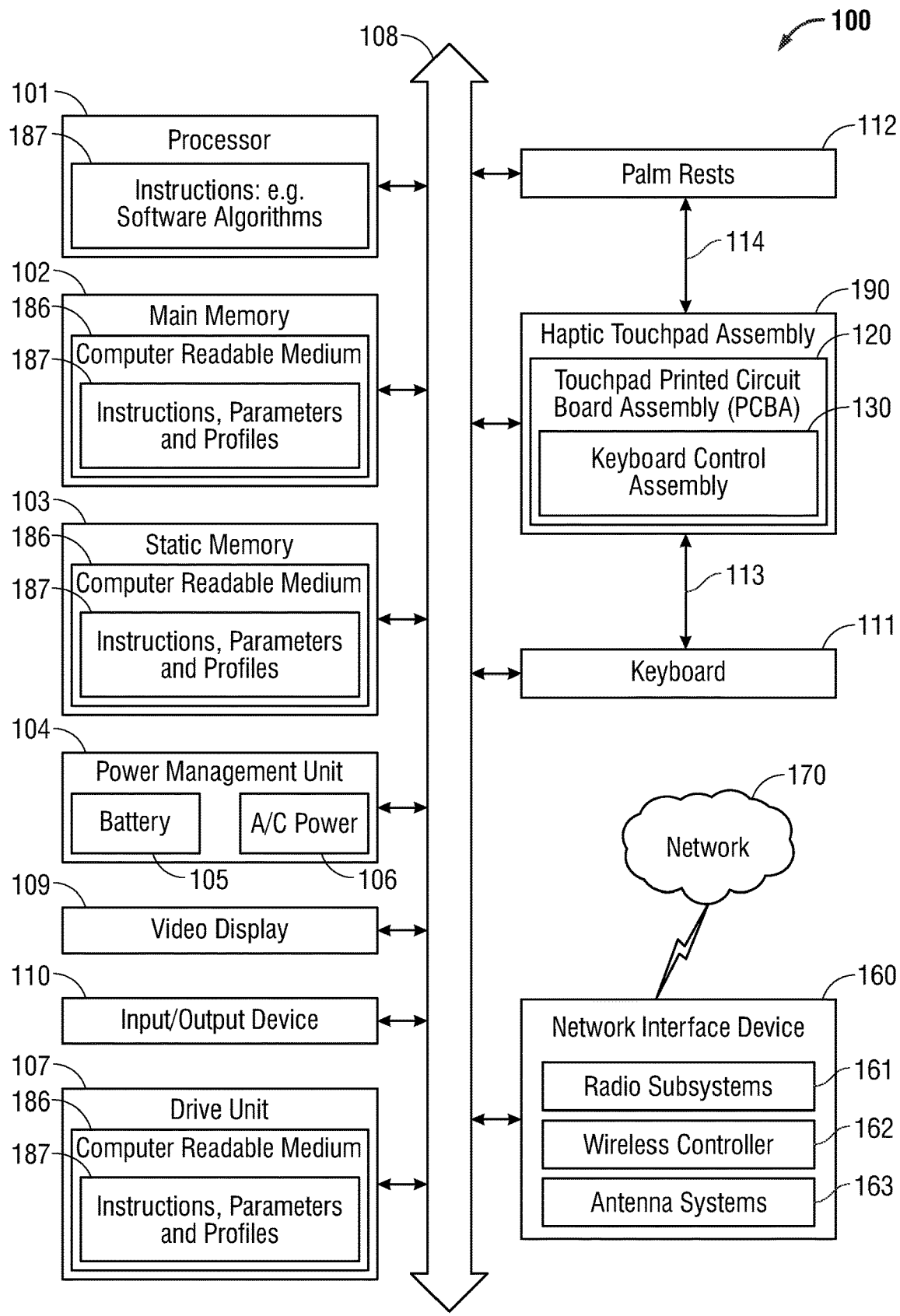
FIG. 1 is a block diagram illustrating an information handling system operably coupled to a haptic touchpad assembly according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Information handling systems, such as notebook, tablet, and laptop computers may include a display chassis housing the video display screen, and a base chassis housing a keyboard, touchpad, and various internal components necessary for operation of the information handling system, such as processors, memory, buses, and network interface devices, for example. The base chassis for such information handling systems may include an upper portion where the keyboard and touchpad may be situated and accessible by the user, and a bottom portion that mates with the upper portion to enclose the various operational components (e.g., processor, memory, etc.). Many conventional base chasses are manufactured by inserting a keyboard and a touchpad into openings formed through the upper portion of the base chassis, such that all four sides of the touchpad and the keyboard are surrounded by the upper portion of the base chassis. In such a windowed design approach, at least one edge of the touchpad assembly (e.g., rear edge lying closest to the keyboard) may need to be firmly attached to the base chassis to prevent movement of the touchpad assembly and allow flex of the touchpad as with a diveboard assembly. This may also cause an inability to physically depress or "click" a portion of the touchpad situated closest to the edge affixed to the base chassis. This windowed design may thus limit the area of the touchpad surface within the confines of the opening of the base chassis operable for a click action. Moreover, the windowed touchpad design may be smaller than embodiments described herein.

In addition, many conventional base chasses employ a polycarbonate-based substrate for the upper portion of the base chassis surrounding the touchpad assembly in such a windowed approach. The base chassis upper portion in such a conventional chassis, for example, may use a single unitary piece of material, which may require borders surrounding the keyboard and the touchpad and have a minimum thickness that is greater than one millimeter. In other words, conventional base chasses may either employ a haptic touchpad assembly having a surface material that differs from the surrounding upper base chassis material, or may require an increase in the thickness and weight of the touchpad assembly including a printed control board (PCB) underlying the touchpad surface, and potentially the thickness and weight of the base chassis as a whole. The windowed island appearance of this design (e.g., placing the keyboard and the touchpad within separate windows) may also be a less desirable design and may deter from the aesthetics of the overall chassis.

In other conventional base chasses, the surface of the touchpad and the area to the left and right of the touchpad, referred to herein as palm rests, may be formed from a single unitary piece of glass that has a seamless surface and a minimum level of stiffness to support proper operation of a haptic feedback piezoelectric device assembly incorporated beneath the touchpad. Although the single glass top cover surface provides the required stiffness for supporting operation of a haptics-enabled touchpad, the glass material of the touchpad has limited durability and is prone to damage such as chipping, cracking, and scratching. Extending the edges of such a single substrate of glass to the outer boundaries of the base chassis may further increase the risk of chipping and cracking, as these outer boundaries routinely impact surrounding objects and surfaces. Thus, the use of such a single glass panel may either result in low durability or may require surrounding the panel within a polycarbonate-based substrate or metallic (e.g., aluminum) border along the edges of the base chassis such as that described directly above.

The use of composite substrate of woven glass fibers impregnated with polycarbonate material as the base chassis upper portion or the upper surface of the touchpad in embodiments of the present disclosure may address the durability and aesthetics issues presented by these conventional designs. Such polycarbonate impregnated composite substrate of woven glass fibers in embodiments of the present disclosure may comprise, for example, a thermoplastic material, and may provide sufficient stiffness to support a haptics-driven touchpad assembly, a lower risk of chipping and cracking than glass, while providing a glass-like finish that is aesthetically pleasing. Further, such a polycarbonate impregnated composite substrate of woven glass fiber may be recyclable or contain recycled polycarbonate material for a lower manufacturing carbon-footprint, enable light diffusion throughout its thickness, allow for transmission of radiofrequency (RF) waves (e.g., RF-transparency), and have an Underwriters Laboratory (UL) 94V-0 flammability rating. In various embodiments herein, the upper surface of a haptics-enabled touchpad assembly and the palm rest surfaces to either side of the haptic touchpad assembly may be comprised of such a polycarbonate impregnated composite substrate of woven glass fiber.

Because such a polycarbonate impregnated composite substrate of woven glass fiber has greater durability than traditional glass panels, the edges of the touchpad and neighboring palm rests may extend to the outer borders of the base chassis, which may include an aluminum surround, without encountering the durability concerns encountered when using a glass panel, as described above. This approach may increase the surface of the touchpad in comparison to the windowed approach may provide for an aesthetic benefit as well. Embodiments of the present disclosure employ a three-panel haptic touchpad and palm rest base chassis assembly providing an aesthetically pleasing, near-seamless, and durable three-panel upper surface with exterior edges bounded by the base chassis support structure with an aluminum or other surround portion or even defining the outer boundary of the base chassis in an embodiment. In some embodiments, an aluminum or other metal may form the vertical walls defining the outer boundary of the base chassis (e.g., a tray), with the three-panel upper surface inserted within these edges as an inlay. In other embodiments, the three-panel haptic touchpad and palm rest base chassis may extend to an exposed edge on or over the base chassis support structure (e.g., the tray). The three panels may be comprised of the same polycarbonate impregnated composite substrate of woven glass fiber that provides a glass-like texture and may allow for base chassis designs other than the windowed island design used in conventional chasses. The upper surface of the haptic touchpad assembly (e.g., the portion manipulated by the user) and both the right and left palm rest support surfaces neighboring the touchpad upper surface may form the three panels, which may also extend away from the user to form a portion of an opening within the base chassis upper portion for insertion of a keyboard. This design may provide a glass-like finish across the majority of the base chassis upper portion (e.g., the touchpad and palm rest surfaces) of uniform texture that extends to the front, left, and right outer boundaries of the base chassis upper portion and to the bottom edge of the keyboard.

In order to ensure close alignment between the touchpad upper surface and the palm rest upper surfaces (e.g., minimizing any gaps between these structures to provide a more seamless appearance), embodiments of the present disclosure may mount the haptic touchpad assembly from the top of the base chassis, rather than the bottom-mounted touchpad dive-board assembly method used in conventional systems. In embodiments, the touchpad may be inserted downward into an opening of the base chassis upper portion and mounted to the base chassis upper portion by inserting top-mounted screws into machined clearance openings within a support bracket mechanically affixed to the touchpad layers and haptics-enabled piezoelectric device assembly. Once these top-mounted screws are in place, the polycarbonate impregnated composite substrate of woven glass fiber panels forming the left and right palm rest may be placed atop the base chassis upper portion so as to conceal the top-mounted screws. In an embodiment in which machined clearance openings are used to secure the support bracket for the touchpad to the base chassis upper portion, the position of the haptic touchpad assembly may be adjusted to ensure the front edge and the rear edge of the haptic touchpad assembly are aligned with the front edge, rear edge, left edge, and right edge of the neighboring palm rest surface panels which are also placed to provide a near-seamless appearance with the haptic touchpad portion. For example, in some embodiments, a camera calibration method such as charge coupled device (CCD) camera alignment may be used to perform such alignments. Vertical gaps between the top surface of the touchpad and the top surfaces of the palm rest panels may also be adjusted or removed by insertion of shims between the support bracket and the base chassis upper portion to which the support bracket has been mounted, if needed. Upon proper alignment of the edges of the touchpad with the palm rest panels, the support bracket for the touchpad and piezoelectric device assemblies may be more firmly mechanically and operatively coupled to the base chassis upper portion via insertion of bottom-mounted screws within threaded openings.

Although the top surface of the haptic touchpad assembly may extend to the front edge of the base chassis in embodiments of the present disclosure, underlying layers of the haptic touchpad assembly and piezoelectric device assembly may be set back from the front edge of the base chassis to provide an open area for insertion of a radiofrequency (RF) antenna. Many information handling systems employ a plurality of RF antennas for communication in more than one communication standard or frequency range (e.g., WWAN, WLAN, Bluetooth®, NFC). Placing plural antennas nearby one another or near reflective structures or interfering components within the chassis may increase interference at these antennas such that space for antennas may be extremely limited within base chassis or other chassis of an information handling system. Thus, there is a need to distribute antennas around the edges of the base chassis where possible. In conventional systems, RF antennas cannot be placed directly under the haptic touchpad assembly situated nearest the front edge of the base chassis because the conventional touchpad polycarbonate material, PCBA, and supporting structure inhibits transmission of RF waves. Because the top surface of the haptic touchpad assembly in embodiments of the present disclosure employ a polycarbonate impregnated composite substrate of woven glass fiber that is RF-transparent, antennas may now be placed on the front edge of the base chassis, located nearest the user, at one or more radiofrequency window locations. This may result in decreased interference at any of multiple antennas, more available solutions for distribution of antennas within the chassis, or the ability to add an additional antenna not previously enclosed within the base chassis in conventional systems to avoid obstructions of other placement locations. In such a way, the three-panel haptic touchpad and palm rest base chassis assembly employing a polycarbonate impregnated composite substrate of woven glass fiber may extend the edges of the touchpad to the neighboring palm rest panels and keyboard as well as to the outer borders of the base chassis in some embodiments, or to a vertical exterior wall formed by a metal in other embodiments, without encountering the durability concerns encountered when using a glass panel, improve antenna signal strength, and minimize the manufacturing carbon footprint.

FIG. 1 illustrates an information handling system 100 according to several aspects of the present disclosure. In a networked deployment, the information handling system 100 may operate in the capacity of a server or as a client computer in a server-client network environment, or as a peer computer system in a peer-to-peer (or distributed) network environment. In a particular embodiment, the information handling system 100 may be implemented using electronic devices that provide voice, video or data communication. The information handling system 100 may include a memory 102, (with computer readable medium 186 that is volatile (e.g. random-access memory, etc.), nonvolatile memory (read-only memory, flash memory etc.) or any combination thereof), one or more hardware processing resources, such as a central processing unit (CPU), a graphics processing unit (GPU), a Visual Processing Unit (VPU) or a Hardware Accelerator, any one of which may be the hardware processor 101 illustrated in FIG. 1, hardware control logic, or any combination thereof. Additional components of the information handling system 100 may include one or more storage devices 103 or 107, a wireless network interface device 160, one or more communications ports for communicating with external devices, as well as various input and output (I/O) devices 110, such as a mouse, a keyboard 111, a touchpad within the haptic touchpad assembly 190, or any combination thereof. A power management unit 104 supplying power to the information handling system 100, via a battery 105 or an alternating current (A/C) power adapter 106 may supply power to one or more components of the information handling system 100, including the hardware processor 101, or other hardware processing resources executing code instructions, the wireless network interface device 160, a static memory 103 or drive unit 107, a, a video display 109, or other components of an information handling system. The video display 109 in an embodiment may function as a liquid crystal display (LCD), an organic light emitting diode (OLED), a flat panel display, or a solid-state display. The information handling system 100 may also include one or more buses (e.g., 108) operable to transmit communications between the various hardware components.

The information handling system 100 may further include a haptic touchpad assembly 190 mounted within a base chassis of the information handling system 100, which may further incorporate a touchpad printed circuit board assembly (PCBA) 120 and a keyboard control assembly 130, as also described in greater detail below with respect to FIG. 2. The haptic touchpad assembly 190 in an embodiment may further be controlled by the touchpad PCBA 120. In some embodiments, the touchpad PCBA 120 may also communicate with the keyboard 111 via a USB link 113. The top surface panel of the haptic touchpad assembly 190 in an embodiment may comprise a substrate of composite substrate of woven glass fiber impregnated with polycarbonate material to provide sufficient stiffness for operation of the haptic touchpad assembly 190 and a durable, aesthetically pleasing glass-like finish that matches neighboring palm rest surface panels, as described in greater detail below with respect to FIG. 3. Further, this top surface panel of the haptic touchpad assembly 190 may be transparent to the transmission of radiofrequency (RF) waves to or from the antenna systems 163 of the network interface device 160. As described in greater detail below with respect to FIGS. 4I, 4J, and 6, this may allow for increased signal strength at the antenna systems 163, due to one or more available antenna windows in the base chassis upper portion cover and even use of additional antennas, with decreased interference from multiple antennas transceiving in similar frequency ranges or obstructing or interfering components within the same base chassis for the information handling system 100.

The information handling system 100 may execute code instructions 187, via one or more hardware processing resources, that may operate on servers or systems, remote data centers, or on-box in individual client information handling systems 100 according to various embodiments herein. In some embodiments, it is understood any or all portions of code instructions 187 may operate on a plurality of information handling systems 100.

The information handling system 100 may include a hardware processor 101 such as a central processing unit (CPU), a graphics processing unit (GPU), a Visual Processing Unit (VPU), or a hardware accelerator, embedded controllers or hardware control logic or some combination of the same. Any of the hardware processing resources may operate to execute code that is either firmware or software code. Moreover, the information handling system 100 may include memory such as main memory 102, static memory 103, containing computer readable medium 186 storing instructions 187. In other embodiments the information handling system 100 may represent a server information handling system executing operating system (OS) software, application software, BIOS software, or other software applications or drivers detectable by hardware processor type 101.

The disk drive unit 107 and static memory 103 may also contain space for data storage in a computer readable medium 186. The instructions 187 in an embodiment may reside completely, or at least partially, within the main memory 102, the static memory 103, and/or within the disk drive 107 during execution by the hardware processor 101. The information handling system 100 may also include one or more buses 108 operable to transmit communications between the various hardware components such as any combination of various input and output (I/O) devices 110, the haptic touchpad assembly 190, the keyboard 111, palm rests 112, or the like.

The network interface device 160 may provide connectivity of the information handling system 100 to the network 170 via a network AP in an embodiment. The network 170 in some embodiments may be a wired local area network (LAN), a wireless personal area network (WPAN), a public Wi-Fi communication network, a private Wi-Fi communication network, a public WiMAX communication network, or other non-cellular communication networks. In other embodiments, the network 170 may be a wired wide area network (WAN), a 4G LTE public network, or a 5G communication network, or other cellular communication networks. Connectivity to any of a plurality of networks 170, one or more APs for those networks, or to a docking station in an embodiment may be via wired or wireless connection. In some aspects of the present disclosure, the network interface device 160 may operate two or more wireless links. In other aspects of the present disclosure, the information handling system 100 may include a plurality of network interface devices, each capable of establishing a separate wireless link to network 170, such that the information handling system 100 may be in communication with network 170 via a plurality of wireless links.

The network interface device 160 may operate in accordance with any cellular wireless data communication standards. To communicate with a wireless local area network, standards including IEEE 802.11 WLAN standards, IEEE 802.15 WPAN standards, WiMAX, or similar wireless standards may be used. Utilization of radiofrequency communication bands according to several example embodiments of the present disclosure may include bands used with the WLAN standards which may operate in both licensed and unlicensed spectrums. For example, WLAN may use frequency bands such as those supported in the 802.11 a/h/j/n/ac/ax/be including Wi-Fi 6, Wi-Fi 6c, and the emerging Wi-Fi 7 standard. It is understood that any number of available channels may be available in WLAN under the 2.4 GHZ, 5 GHZ, or 6 GHZ bands which may be shared communication frequency bands with WWAN protocols or Bluetooth® protocols in some embodiments.

The network interface device 160, in other embodiments, may connect to any combination of cellular wireless connections including 2G, 2.5G, 3G, 4G, 5G or the like from one or more service providers or privately administered by an enterprise. Utilization of radiofrequency communication bands according to several example embodiments of the present disclosure may include bands used with the WWAN standards, which may operate in both licensed and unlicensed spectrums. More specifically, the network interface device 160 in an embodiment may transceive within radio frequencies associated with the 5G New Radio (NR) Frequency Range 1 (FR1) or Frequency Range 2 (FR2). NRFR1 may include radio frequencies below 6 GHz, associated with 4G LTE and other standards predating the 5G communications standards. NRFR2 may include radio frequencies above 6 GHZ, made available within the emerging 5G communications standard. Communications within NRFR1 may be enabled through the use of either an eNodeB executing an evolved packet core of an existing LTE system, or a Next Generation Node B (gNodeB) executing the next generation packet core of the 5G cellular standard. Frequencies related to the 5G networks may include high frequency (HF) band, very high frequency (VHF) band, ultra-high frequency (UHF) band, L band, S band, C band, X band, Ku band, K band, Ka band, V band, W band, and millimeter wave bands.

In an embodiment, the network interface device 160 may be communicatively coupled to one or more antenna systems 163 used to provide one or more separate communication channels to the network 170. Such communications channels may be found in any communication network described herein. The antennas 163 may support Wi-Fi 6, Wi-Fi 6e, the emerging Wi-Fi 7, or a 5G wireless communication protocol so that relatively higher amounts of data may be transceived by the information handling system 100 to any communication network to which the information handling system 100 is communicatively coupled in some embodiments.

The wireless controller 162 may execute instructions for monitoring wireless link state information, wireless link configuration data, network slice data, or other input data to generate channel estimation and determine antenna radiation patterns. For example, the wireless controller 162 in an embodiment may gather beacon data received from one or more nearby access points (APs) for the network 170 describing channels available for communication with that AP, as well as various current traffic metrics for communications on those channels. More specifically, such beacon information may provide a relative signal strength indicator (RSSI), identification of the network 170 as private or public, identification of the network 170 as compatible with multiple user, multiple input, multiple output (MU-MIMO) communications, high available data rate, levels of channel contention, and current load of communications at the AP. Wireless controller 162 may also control selection from among an available plurality of antennas 163 via antenna switching or adjust antenna matching or antenna directionality in some cases for antenna systems 173. The network interface device 160 in an embodiment may further include a radio subsystem 161 which may operate to modulate and demodulate signals transceived within a WWAN or WLAN format, set signal transmission power levels or sensitivity to signal reception, select channels or frequency bands, and conduct other functions in support of a wireless transmission from the information handling system 100 to the communication network 170.

In some embodiments, hardware executing software or firmware, dedicated hardware implementations such as application specific integrated circuits, programmable logic arrays and other hardware devices may be constructed to implement one or more of some systems and methods described herein. Applications that may include the hardware processing resources executing systems of various embodiments may broadly include a variety of electronic and computer systems. One or more embodiments described herein may implement functions using two or more specific interconnected hardware modules or devices with related control and data signals that may be communicated between and through the hardware modules, or as portions of an application-specific integrated circuit. Accordingly, the present embodiments encompass hardware processing resources executing software or firmware, or hardware implementations.

In accordance with various embodiments of the present disclosure, the methods described herein may be implemented by firmware or software programs executable by a hardware controller, a hardware processor system, or other hardware processing resources. Further, in an exemplary, non-limited embodiment, implementations may include distributed processing, component/object distributed processing, and parallel processing. Alternatively, virtual computer system processing may be constructed to implement one or more of the methods or functionalities as described herein. Various software modules comprising application instructions 187 may be coordinated by an operating system (OS), and/or via an application programming interface (API). An example operating system may include Windows®, Android®, and other OS types. Example APIs may include Win 32, Core Java API, or Android APIs. Application instructions 187 may also include any application processing drivers, or the like executing on information handling system 100.

Main memory 102 may contain computer-readable medium (not shown), such as RAM in an example embodiment. An example of main memory 102 includes random access memory (RAM) such as static RAM (SRAM), dynamic RAM (DRAM), non-volatile RAM (NV-RAM), or the like, read only memory (ROM), another type of memory, or a combination thereof. Static memory 103 may contain computer-readable medium (not shown), such as NOR or NAND flash memory in some example embodiments. The instructions, parameters, and profiles 187 may be stored in static memory 103, or the drive unit 107 on a computer-readable medium 186 such as a flash memory or magnetic disk in an example embodiment.

While the computer-readable medium is shown to be a single medium, the term "computer-readable medium" includes a single-medium or multiple-media, such as a centralized or distributed database, and/or associated caches and servers that store one or more sets of instructions. The term "computer-readable medium" shall also include any medium that is capable of storing, encoding, or carrying a set of instructions for execution by a hardware processor or that cause a computer system to perform any one or more of the methods or operations disclosed herein.

In a particular non-limiting, exemplary embodiment, the computer-readable medium may include a solid-state memory such as a memory card or other package that houses one or more non-volatile read-only memories. Further, the computer-readable medium may be a random-access memory or other volatile re-writable memory. Additionally, the computer-readable medium may include a magneto-optical or optical medium, such as a disk or tapes or other storage device to store information received via carrier wave signals such as a signal communicated over a transmission medium. Furthermore, a computer readable medium may store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In some embodiments, dedicated hardware implementations such as application specific integrated circuits, programmable logic arrays and other hardware devices may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein may be configured as hardware, or as software or firmware executing on a hardware processing resource. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The hardware system, hardware device, hardware controller, or hardware module may execute software, including firmware embedded at a device, such as an Intel® brand hardware processor, ARM® brand hardware processors, Qualcomm® brand hardware processors, or other hardware processors and chipsets, or other such device, or software capable of operating a relevant environment of the information handling system. The hardware system, hardware device, hardware controller, or hardware module may also comprise a combination of the foregoing examples of hardware, or hardware processors executing firmware or software. In an embodiment an information handling system 100 may include an integrated circuit or a board-level product having portions thereof that may also be any combination of hardware and hardware executing software. Hardware devices, hardware modules, hardware resources, or hardware controllers that are in communication with one another need not be in continuous communication with each other. unless expressly specified otherwise. In addition, hardware devices, hardware modules, hardware resources, or hardware controllers that are in communication with one another may communicate directly or indirectly through one or more intermediaries.

Figure 2:
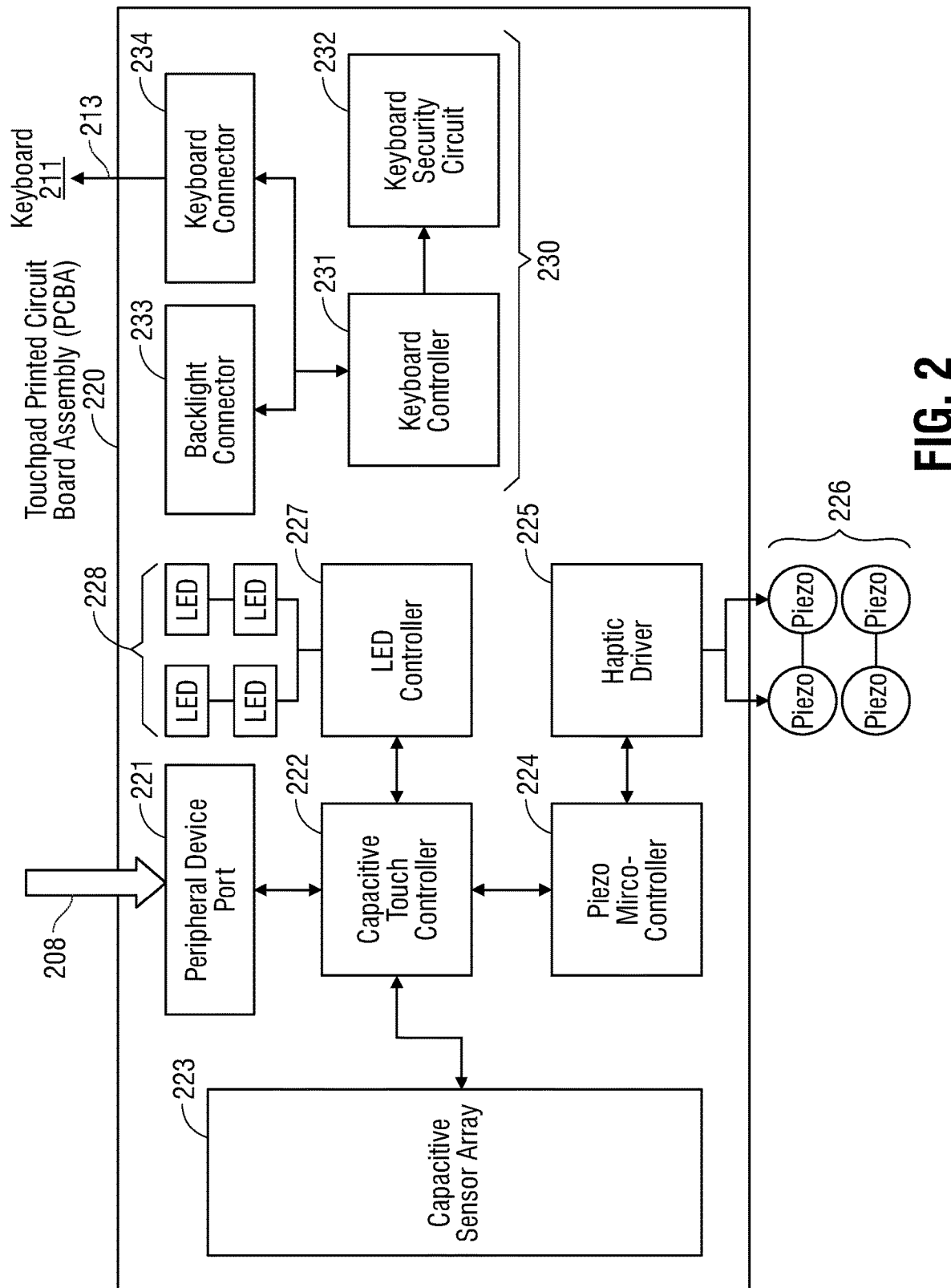
FIG. 2 is a block diagram illustrating a touchpad printed circuit board assembly (PCBA) according to an embodiment of the present disclosure.

FIG. 2 is a block diagram illustrating a touchpad printed circuit board assembly (PCBA) operably coupled to a keyboard and an internal bus of an information handling system according to an embodiment of the present disclosure. As described herein, the information handling system (e.g., FIG. 1 at 100) may include a haptic touchpad assembly mounted within a base chassis, and incorporating a touchpad printed circuit board assembly (PCBA) 220. The touchpad PCBA 220 may be operably coupled to various components of the information handling system (e.g., 100 of FIG. 1) via the bus 208 (also described in FIG. 1 as 108) and peripheral device port 221.

The touchpad PCBA 220 in an embodiment may house operational circuitry for control of various input/output peripheral devices, such as a touchpad, a keyboard, various light emitting diodes (LEDs) 228 and a piezo-haptic assembly which may include one or more piezo actuators 226. In other embodiments, a Linear Resonance Actuator (LRA) motor assembly may be used instead of a piezo-haptic assembly for haptic feedback. In an example embodiment employing a piezo-haptic assembly with one or more piezo actuators 226, the touchpad PCBA 220 in an embodiment may include a capacitive sensor array 223 capable of sensing touch by a user via capacitive touch controller 222 for touches along the touchpad surface panel through changes in capacitance to operate as a cursor control device. The capacitive sensor array 223 and capacitive touch controller 222 in an embodiment may identify when such touch has occurred, and a location of such touch along the touchpad surface panel (e.g., as described in greater detail below with respect to FIG. 3). In some embodiments, the capacitive sensor array 223 may also associate, with the capacitive touch controller 222, a location of touch with a light-emitting icon (e.g., as also described in greater detail below with respect to FIG. 3) that may be further associated with a command instruction for execution by the hardware processor (e.g., 101 or FIG. 1), the piezo micro-controller 224, or various peripheral devices such as speakers or microphones (e.g., volume up/down, microphone mute). The capacitive sensor array 223 in an embodiment may transmit notification of detected touch along the touchpad surface panel and any associated command instructions locations (e.g., associated with touch of a specific light-emitting icon) to the capacitive touch controller 222 to register an associated command, cursor control, selection, or other touchpad function in an embodiment.

In an embodiment, the capacitive touch controller 222 may be an integrated circuit or microcontroller, such as the Gen6 touch controller platform from Cirque®, for example. The capacitive touch controller 222 in an embodiment may receive input from the capacitive sensor array 222 and transmit such instructions to processors or controllers for execution of associated command instructions. For example, the capacitive touch controller 222 in an embodiment may communicate with an LED controller 227 to control light emitted from one or more LEDs 228. In an embodiment described in greater detail below with respect to FIG. 3, such an LED 228 may be situated beneath a light-emitting icon situated along the touchpad surface panel that may be selected by a user via touch sensed by the capacitive sensor array 223.

As another example, an instruction received from the capacitive sensor array 223 for movement of a cursor in accordance with a sensed touch by the user along the touchpad surface panel in an embodiment may be determined by the capacitive touch controller 222 and transmitted to the hardware processor (e.g., 101 of FIG. 1) of the information handling system, or to the video display (e.g., 109 of FIG. 1) via the peripheral device port 221 and the bus 208. In another embodiment, an instruction received from the capacitive sensor array 223 for initiation of haptic feedback by the piezo devices 226 or other haptic actuator such as a linear resonant actuator (LRA) in response to a sensed touch by the user along a light-emitting icon (e.g., as described in greater detail below with respect to FIG. 3) may be transmitted to the piezo micro-controller 224. In still another embodiment, instructions for initiation of piezos 226 may be received via the peripheral device port 221 and bus 208 from the hardware processor (e.g., 101 of FIG. 1) in response to execution of various software applications (e.g., 187 of FIG. 1). In other embodiments, the haptic feedback may be provided by structures other than piezos, such as linear response actuator assemblies or voice coil magnetic haptic assemblies. In such other embodiments, 226 may represent linear response actuators, or voice coil magnetic haptic actuators, respectively.

The piezo micro-controller 224 in an embodiment may control one or more piezo actuators 226 via a haptic driver 225. In an example embodiment, the piezo micro-controller 224 may be a 32-bit microcontroller (MCU) from STMicroelectronics®. The piezo micro-controller 224 in an embodiment may operate to store haptic waveforms, determine whether sufficient downward force on the touchpad surface panel has been detected by the capacitive sensor array 223 to trigger a haptic response via the piezo actuators 226, and transmit specific instructions for initiation or firing of the piezo actuators 226 to a haptic feedback response that may be sensed by various portions of the user's hand that are in contact with the touchpad surface panel. Piezo actuators 226 are also referred to as piezoelectric devices in piezoelectric device assemblies and provide haptic actuation for haptic feedback to users touching the touchpad surface panel in some embodiments. These firing instructions may be transmitted to the haptic driver 225, which may operate to apply electrical pulses in accordance with the stored haptic waveforms (e.g., pulsing, steady vibration, clicking) to one or more of the piezo actuators 226. In an embodiment, the piezo actuators 226 may be situated along various points beneath the touchpad surface panel such that specific piezo actuators 226 are meant to cause haptic feedback felt by specific portions of the user's hands. For example, one of the piezo actuators 226 may be situated in the lower left-hand portion of the touchpad surface panel to provide haptic feedback to a user's left thumb. The piezo micro-controller 224 and the haptic driver 225 in an embodiment may fire only this lower-left piezoelectric device assembly in response to sensed touch within the lower-left hand portion of the touchpad surface panel by the capacitive sensor array 223, for example, or in response to command instructions received from the hardware processor (e.g., 101 of FIG. 1) due to execution of various software applications (e.g., firing of a weapon within a video game).

The touchpad PCBA 220 in some embodiments may further include a keyboard controller 230 in communication with a keyboard 211 via USB link 213. Keyboard controller 230 (e.g., ECE-1117) in an embodiment may operate to receive input from the keyboard 211 (e.g., sensed pressing of various keys by a user), as well as control of a backlight connector 233, a keyboard connector 234, and a keyboard security circuit 232.

FIG. 3 is a graphical diagram illustrating a top view of a base chassis for an information handling system including a three-panel touchpad and palm rest assembly according to an embodiment of the present disclosure. An information handling system in an embodiment, or portions thereof, may be enclosed or housed within a base chassis that may be formed by joining a base chassis upper portion 310 with a base chassis lower portion (not shown). The base chassis upper portion 310 in an embodiment may include an opening 330 for insertion of a keyboard, as well as an opening (e.g., as described below with respect to FIG. 4C) for insertion of a haptic touchpad assembly that includes a touchpad surface panel 320. As described in greater detail below with respect to FIG. 4E, a left palm rest surface panel 302 and a right palm rest surface panel 303 may be mounted to palm rest support surfaces (not shown) of the base chassis upper portion 310.

As described herein, many conventional base chasses are manufactured using a windowed design approach inserting a keyboard and a touchpad into openings formed through the upper portion of the base chassis, such that all four sides of the touchpad and the keyboard are surrounded by the upper portion of the base chassis. This may cause an inability to physically depress or "click" a portion of the touchpad situated closest to the edge affixed to the base chassis for such a diveboard type touchpad assembly and limit the surface area of the touchpad to the size of the window opening. The base chassis upper portion in such a conventional chassis, for example, may use a single unitary piece of material which may also require borders surrounding the touchpad to have a minimum thickness. The windowed island appearance of this design (e.g., placing the keyboard and the touchpad within separate windows) and having either the differing surface materials (e.g., between the touchpad surface and the base chassis upper portion that forms the windows) or the windowed look may also deter from the aesthetics of the overall chassis.

In other conventional base chasses, the surface of the touchpad and the area to the left and right of the touchpad, referred to herein as palm rests, may be formed from a single unitary piece of glass that has a seamless surface. Although the single glass top cover surface provides the required stiffness for supporting operation of a haptics-enabled touchpad, the glass material of the touchpad has limited durability and is prone to damage such as chipping, cracking, and scratching. Extending the edges of such a single substrate of glass to the outer boundaries of the base chassis or to vertical metallic walls defining the outer boundaries of the base chassis may further increase the risk of chipping and cracking, as these outer boundaries routinely impact surrounding objects and surfaces. Thus, the use of such a single glass panel may either result in low durability or may require enclosing the panel within a polycarbonate-based substrate border, or metal border along the edges of the base chassis such as that described directly above.

Use of a polycarbonate impregnated composite substrate of woven glass fiber to form a touchpad surface 320, a left palm rest surface panel 302 and a right palm rest surface panel 303 in an embodiment may provide sufficient stiffness to support a haptics-driven touchpad assembly, and provide a lower risk of chipping and cracking than glass, while providing a glass-like finish that is aesthetically pleasing. Because such a polycarbonate impregnated composite substrate of woven glass fiber (e.g., thermoplastic) has greater durability than traditional glass panels, the edges of the touchpad surface panel 320 and neighboring palm rest surface panels 302 and 303 may extend to metallic vertical walls forming the outer borders of the base chassis as a tray for insertion of the palm rest surface panels 302 and 303 as an inlay, as described in greater detail below with respect to FIG. 4K or extend to the outer borders of the base chassis upper portion 310 to provide a further seamless look and without encountering the durability concerns encountered when using a glass panel, as described above.

Embodiments of the present disclosure employ a three-panel haptic touchpad and palm rest base chassis assembly 300 providing an aesthetically pleasing and durable three-panel upper surface with exterior edges defining the outer boundary of the base chassis. In some embodiments, as described in greater detail below with respect to FIG. 4K, the outer boundaries of the base chassis upper surface may be defined by vertical walls of a metallic material, such as aluminum, for example. These vertical walls may surround the front edge of the touchpad surface panel, the left palm rest surface panel front edge, the right palm rest surface panel front edge, the left edge of the left palm rest surface panel, and the right edge of the right palm rest surface panel, so as to form a tray for insertion of the left palm rest surface panel, the right palm rest surface panel, and the touchpad surface panel. The three panels may be comprised of the same polycarbonate impregnated composite substrate of woven glass fiber that provides a glass-like texture and may increase the surface area and "clickable" area of the touchpad in comparison to the windowed island design used in conventional chasses. The upper surface of the haptic touchpad assembly (e.g., surface panel 320 manipulated by the user) and both the right and left palm rest surface panels 302 and 303 neighboring the touchpad upper surface may form the three panels, which may also extend away from the user to form a portion of an opening 330 within the base chassis upper portion 310 for insertion of a keyboard. This design may provide a near-seamless, glass-like finish across the majority of the base chassis upper portion 310 (e.g., the touchpad and palm rest surfaces, 302, 303, and 320) of uniform texture that extends to the front, left, and right outer boundaries of the base chassis upper portion 310 and to the bottom edge of the keyboard opening 330.

A polycarbonate impregnated composite substrate of woven glass fiber in an embodiment may be used to form the touchpad surface panel 320, the left palm rest surface panel 302 and the right palm rest surface panel 303. Such a substrate may have a thickness at the side walls (e.g., left, right, front and rear edges) of less than 5 millimeters (e.g., from 0.3 to 5 millimeters, alternatively from 2 to 5 millimeters, and alternatively of 1 millimeter) in various embodiments. This thickness of the polycarbonate impregnated composite substrate of woven glass fiber may provide sufficient cover stiffness in an embodiment for acceptable touchpad rigidity and mechanical operation (e.g., without requiring an extra top surface or bottom surface for extra rigidity) compared to conventional touchpad and palm rest surface panels, and without bending or deformation occurring at the edges of the touchpad surface panel 320, left palm rest surface panel 302 or right palm rest surface panel 303. Thus, the top surface panel 320 of the haptic touchpad assembly in an embodiment may provide sufficient stiffness for operation of the haptic touchpad assembly and a durable, aesthetically pleasing glass-like finish that matches neighboring palm rest surface panels 302 and 303. In other embodiments, the left palm rest surface panel 302 and the right palm rest surface panel 303 may be made of a thin polycarbonate material since it is supported by a sub-surface support structure of the upper portion of the base chassis.

The polycarbonate impregnated composite substrate of woven glass fiber forming the touchpad surface panel 320 in an embodiment may further be light transmissive in one or more areas, so as to allow the transmission of light from a light emitting diode (LED) situated beneath the touchpad surface panel 320 through one or more light-emitting icons 301 situated thereon. The light-emitting icons 301 in an embodiment may be etched into the impregnated polycarbonate material of the touchpad surface panel 320, so as to form a function row, for example. When present, each of the light emitting icons 301 may be illuminated from beneath the touchpad surface panel 320 (e.g., lit by one or more upward-facing light elements such as LEDs mounted within the haptic touchpad assembly or a lightguide directing light, as described in greater detail below with respect to FIG. 4G or FIG. 5). Light emitted from such an LED in an embodiment may be visible to a user of the information handling system to indicate status or indicate touch-sensitive function buttons such as audio, volume, audio mute, microphone on/off, for example. In one embodiment, one or more sensors of a capacitive touch sensor or a portion of a capacitive touch sensor array may also be attached to the touchpad surface panel 320 in position beneath the individual icons 301 and designated to accept user touch input to control the respective functions of each icon, as described in greater detail below with respect to FIG. 4G. This is in addition to sensors of such a capacitive touch sensor array capable of sensing location of user touch input provided to the touchpad surface panel 320 by fingers of a user, as described in greater detail above with respect to FIG. 2 and below with respect to FIG. 4A.

Figure 4A:
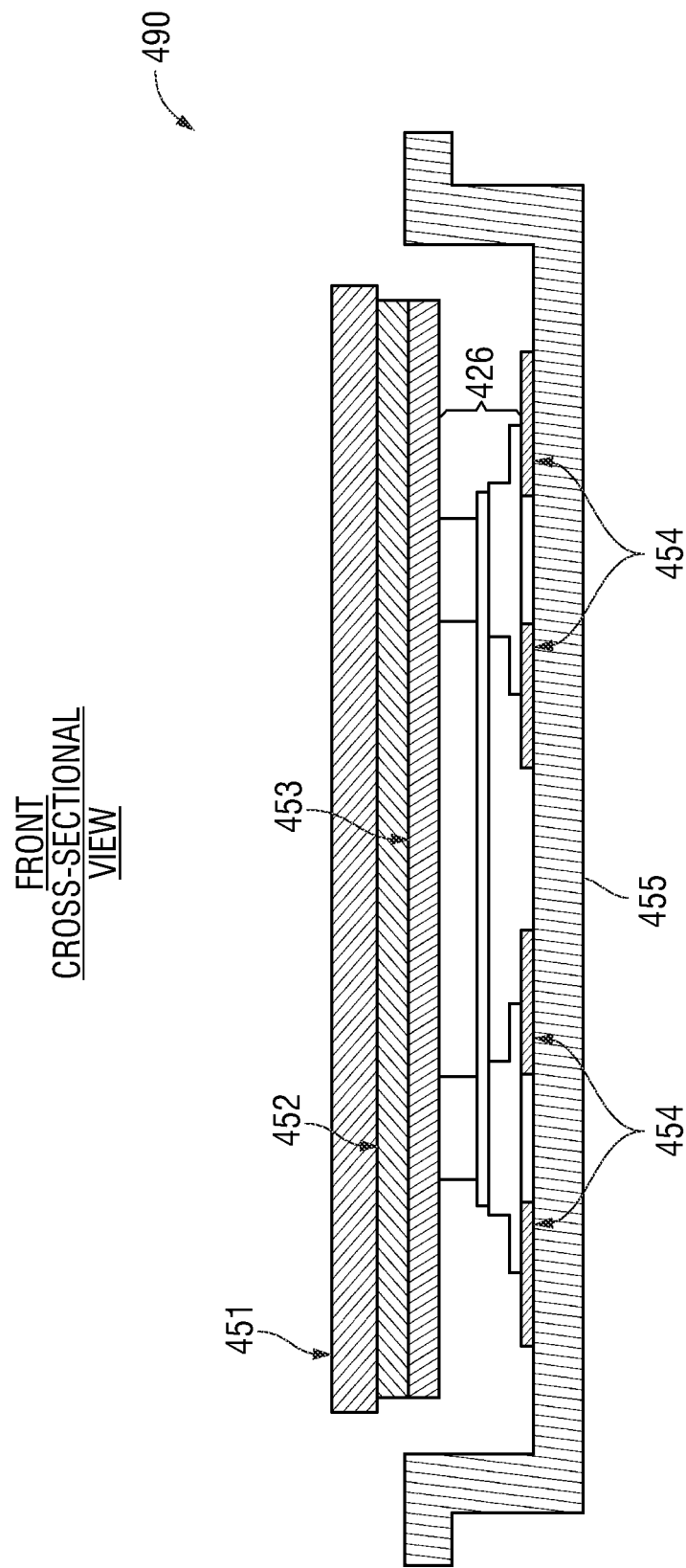
FIG. 4A is a graphical diagram illustrating a front cross-sectional view of a haptic touchpad assembly according to an embodiment of the present disclosure.

FIG. 4A is a graphical diagram illustrating a front cross-sectional view of a haptic touchpad assembly incorporating a piezoelectric device assembly for haptic user feedback according to an embodiment of the present disclosure. As described herein, sensors of a capacitive touch sensor array (e.g., as described in greater detail above with respect to FIG. 2) may be capable of sensing location of user touch input provided to a touchpad surface panel 451 of a haptic touchpad assembly 490. The haptic touchpad assembly 490 in an embodiment may include a lightguide layer 452 operatively connected to the touchpad surface panel 451 and the touchpad printed circuit board assembly (PCBA) 453. PCBA 453, in some embodiments, may include a capacitive touch sensing array on a top side, for example, to sense touch location by a user on top surface panel 451. Functionality and hardware components of the touchpad PCBA 453, including controllers for operation of one or more piezo actuators within piezoelectric device assembly 426 in an embodiment are described in greater detail above with respect to FIG. 2. The piezoelectric device assemblies 426 in an embodiment may be disposed beneath and mechanically joined to the touchpad PCBA 453 on the surface opposite the lightguide layer 452. for example. A touchpad support bracket 455 may be mechanically and operatively coupled to the piezoelectric device assemblies 426, and to the touchpad PCBA 453 to form haptic touchpad assembly 490. As described in greater detail below with respect to FIGS. 4B-4L, the support bracket 455 may operate to fix the haptic touchpad assembly 490 in place with respect to a base chassis upper portion (not shown) for the information handling system, and to provide sufficient rigidity for the haptic touchpad assembly 490 to function properly.

As described in greater detail below with respect to FIG. 2, piezo actuators within the piezoelectric device assembly 426 may be situated along various points beneath the touchpad surface panel 451, and other layers in parts such as light guide 452 or PCBA 453 with a capacitive touch sensor array. Thus, specific piezo actuators are meant to cause haptic feedback felt by specific portions of the user's hands that may touch the touchpad surface panel 451. For example, one of the piezo actuators within the piezoelectric device assembly 426 may be situated in the upper center portion of the touchpad surface panel 451 to provide haptic feedback to a user's index finger of either hand interfacing there. One or more piezo isolation spacers 454 may be situated directly beneath the piezoelectric device assemblies 426 to provide clearance between the piezo actuator and the touchpad support bracket 455 during deflection, and to provide electrical isolation between a brass conductive layer of the high voltage piezo and the metallic touchpad support bracket 455.

Figure 4B:
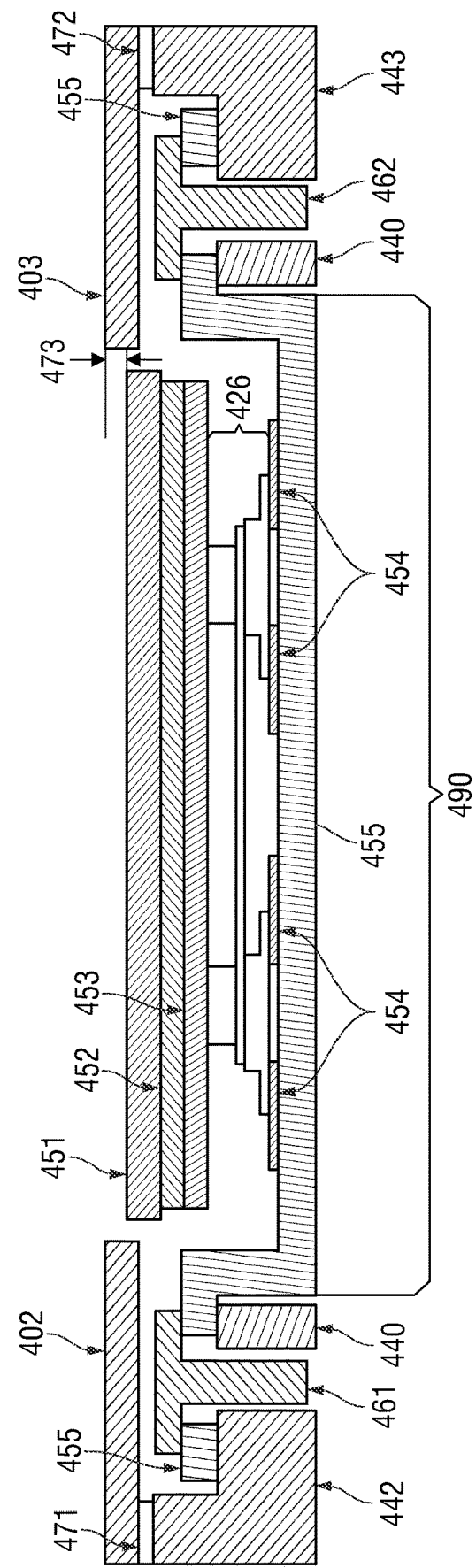
FIG. 4B is a graphical diagram illustrating a front cross-sectional view of a haptic touchpad assembly mechanically and operatively coupled to a base chassis upper portion according to an embodiment of the present disclosure.

FIG. 4B is a graphical diagram illustrating a front cross-sectional view of a top-mounted haptic touchpad assembly 490 mechanically and operatively coupled to a base chassis upper portion 440 via top-mounted fasteners 461 according to an embodiment of the present disclosure. As described herein, the touchpad surface panel 451, left palm rest surface panel 402, and right palm rest surface panel 403 may be composed of a polycarbonate impregnated composite substrate of woven glass fiber (e.g., thermoplastic) that has greater durability than conventional base chasses for information handling systems such as laptop computers or tablet computers, for example. In other example embodiments, the left palm rest surface panel 402, and right palm rest surface panel 403 may simply be polycarbonate since they are supported more directly by the base chassis support tray with no piezo actuators underneath. In either embodiment, the edges of the touchpad surface panel 451 and neighboring palm rests 402 and 403, respectively, may extend to side metal walls or to the outer borders of the base chassis without encountering the durability concerns encountered when using a glass panel such as with the touchpad surface panel 451 or any keyboard.

In order to ensure close alignment between the touchpad surface panel 451 and the palm rest surface panels 402 and 403, respectively (e.g., minimizing any gaps between these structures to provide a more seamless appearance), the haptic touchpad assembly 490 (e.g., 390 from FIG. 3, including the touchpad surface panel 451, lightguide layer 452, touchpad PCBA 453, piezoelectric device assembly 426, piezo isolation spacers 454, and support bracket 454) may be mounted within an upper portion of the base chassis such as shown at 440 including palm rest support surfaces 442, and 443 from the top, rather than the bottom-mounted touchpad dive-board assembly method used in conventional systems. For example, the support bracket 455 may be partially fixed in place with respect to the base chassis upper portion 440 on either side (e.g., right and left) of the support bracket 455 via top-mounted fasteners 461 and 462 in embodiments herein. In one example embodiment, the top-mounted side fasteners 462 may comprise screws operably connected to hardware (e.g., nut or post) inserted into machined clearance openings formed within the base chassis upper portion 440, 442 and 443 as shown that includes the palm rest support sections 442 and 443 of the base chassis upper portion (e.g., as described in greater detail below with respect to FIGS. 4C and 4D). The base chassis upper portion 440 may further comprise a left palm rest support surface 442 and a right palm rest support surface 443 for mounting of the left palm rest surface panel 402 and the right palm rest surface panel 403, via adhesive layers 471 and 472, respectively, as described in greater detail below with respect to FIG. 4E.

As described in greater detail below with respect to FIGS. 4D through 4E, the haptic touchpad assembly 490 (e.g., 390 from FIG. 3, including the touchpad surface panel 451, lightguide layer 452, touchpad PCBA 453, piezoelectric device assembly 426, piezo isolation spacers 454, and support bracket 454) in an embodiment may be operatively coupled to the base chassis upper portion 440 prior to operatively connecting the palm rest surface panels 402 and 403 to the palm rest support surfaces 442 and 443. This may allow the manufacturer to adjust the location of the touchpad surface panel 451 or its height such that it is aligned with the edges of the palm rest surface panels 402 and 403 prior to finally fixing each of these structures (e.g., 490, 402 and 403) in place with respect to the base chassis upper portion 440 (e.g., as described in greater detail below with respect to FIGS. 4F and 4G). For example, in some embodiments, a camera calibration method such as charge coupled device (CCD) camera alignment may be used to perform such alignments.

This may also allow the manufacturer to gauge any vertical displacement 473 between the touchpad surface panel 451 and the palm rest surface panels 402 and 403 and ensure lower tolerances between the same prior to finally fixing these structures in place. The manufacturer may temporarily join the palm rest surface panels 402 and 403 to the base chassis upper portion 440 in an embodiment in order to gauge this distance. To increase aesthetics, such a vertical displacement 473 may be minimized as much as possible, giving the three-panel touchpad and palm rest base chassis assembly the appearance of a near-seamless, single sheet of glass. As described in greater detail below with respect to FIG. 4H, if the vertical displacement 473 is above a maximum tolerance (e.g., 0.25 mm), a shim may be placed between the support bracket 454 and palm rest support surfaces 442 and 443 of the base chassis 440, respectively, to push the touchpad surface panel 451 upward and closer to the left and right palm rest surface panels 402 and 403.

Figure 4C:
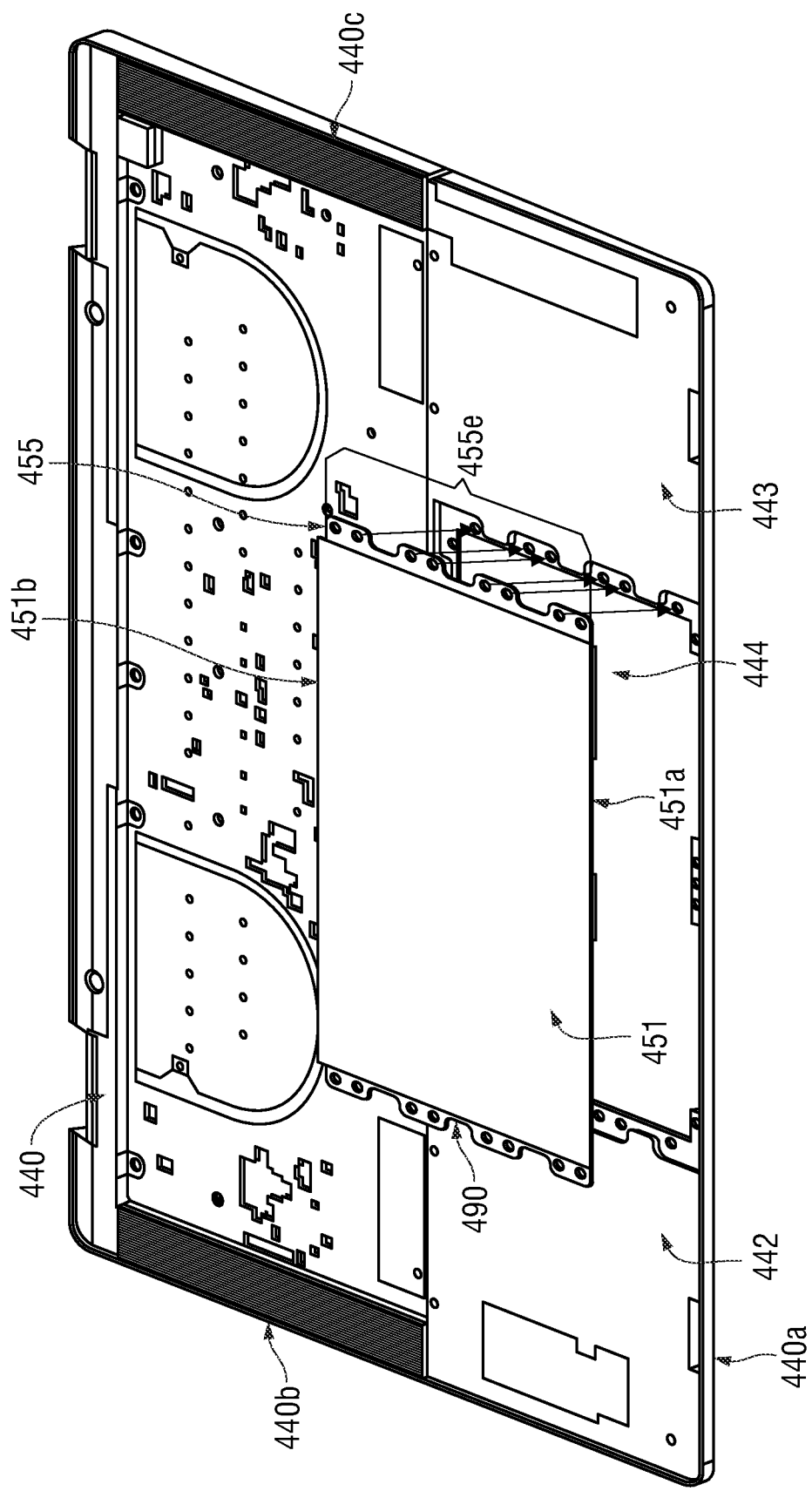
FIG. 4C is a graphical diagram illustrating a perspective view of a haptic touchpad assembly inserted within a base chassis upper portion according to an embodiment of the present disclosure.

FIG. 4C is a graphical diagram illustrating a perspective view of a top-mounted haptic touchpad assembly inserted within a base chassis upper portion according to an embodiment of the present disclosure. As described herein, the haptic touchpad assembly 490 in an embodiment may be inserted within a touchpad opening 444 of the base chassis upper portion 440. In an embodiment, the base chassis upper portion 440 may include a base chassis upper portion front boundary 440a, a base chassis upper portion left side boundary 440b, a base chassis upper portion right side boundary 440c, a left palm rest support surface 442, and a right palm rest support surface 443. The haptic touchpad assembly 490 may include a touchpad surface panel 451 having a touchpad surface panel front edge 451a, a touchpad surface panel rear edge 451b, with the touchpad surface panel 451 operatively connected to the support bracket 455 (e.g., with intervening layers such as the lightguide layer, touchpad PCBA with a capacitive touch array, piezo isolators, and piezoelectric device assemblies described in greater detail above with respect to FIG. 4A). The support bracket 455 in an embodiment may include a plurality of machined clearance openings 455e to either side of the touchpad surface panel 451 for receiving hardware (e.g., nut or post) into which fasteners such as a screw may be inserted to operatively couple the support bracket 455 to the base chassis upper portion 440, the left palm rest support surface 442, or the right palm rest support surface 443, as described in greater detail above with respect to FIG. 4B, or below with respect to FIG. 4D.

FIG. 4D is a graphical diagram illustrating a top view of a top-mounted haptic touchpad assembly mechanically and operatively coupled to a base chassis upper portion via top-mounted fasteners for alignment with a front edge and a keyboard opening of the base chassis according to an embodiment of the present disclosure. As described herein, the haptic touchpad assembly 490 (e.g., including the touchpad surface panel 451 operatively connected to support bracket 454) in an embodiment may be operatively coupled to the base chassis upper portion 440 prior to operatively connecting the palm rest surface panels to the left palm rest support surface 442 and right palm rest support surface 443, respectively. For example, the support bracket 455 in an embodiment may include a support bracket left side 455c operatively coupled to the base chassis upper portion 440 or the left palm rest support surface 442 via top-mounted left-side fasteners 461 (e.g., threaded screws) and a support bracket right side 455d operatively coupled to the base chassis upper portion 440 or the right palm rest support surface 443 via top-mounted right-side fasteners 462 (e.g., threaded screws). This support bracket left side 455c and support bracket right side 455d may be movable with plural alignment holes to allow the manufacturer to adjust the location of the touchpad surface panel 451 by moving the touchpad surface panel 451 forward, toward the base chassis upper portion front boundary (e.g., 440a of FIG. 4C), backward toward the base chassis upper portion rear edge (e.g., 451b of FIG. 4C), to the left toward the left palm rest support surface 442, of to the right toward the right palm rest support surface 443. The manufacturer may perform such positional adjustments to ensure the touchpad surface panel 451 is aligned with the edges of the palm rest surface panels while minimizing tolerance prior to finally fixing each of these structures in place with respect to the base chassis upper portion 440 (e.g., as described in greater detail below with respect to FIGS. 4F and 4G). For example, in some embodiments, a camera calibration method such as charge coupled device (CCD) camera alignment may be used to perform such alignments.

Figure 4E:
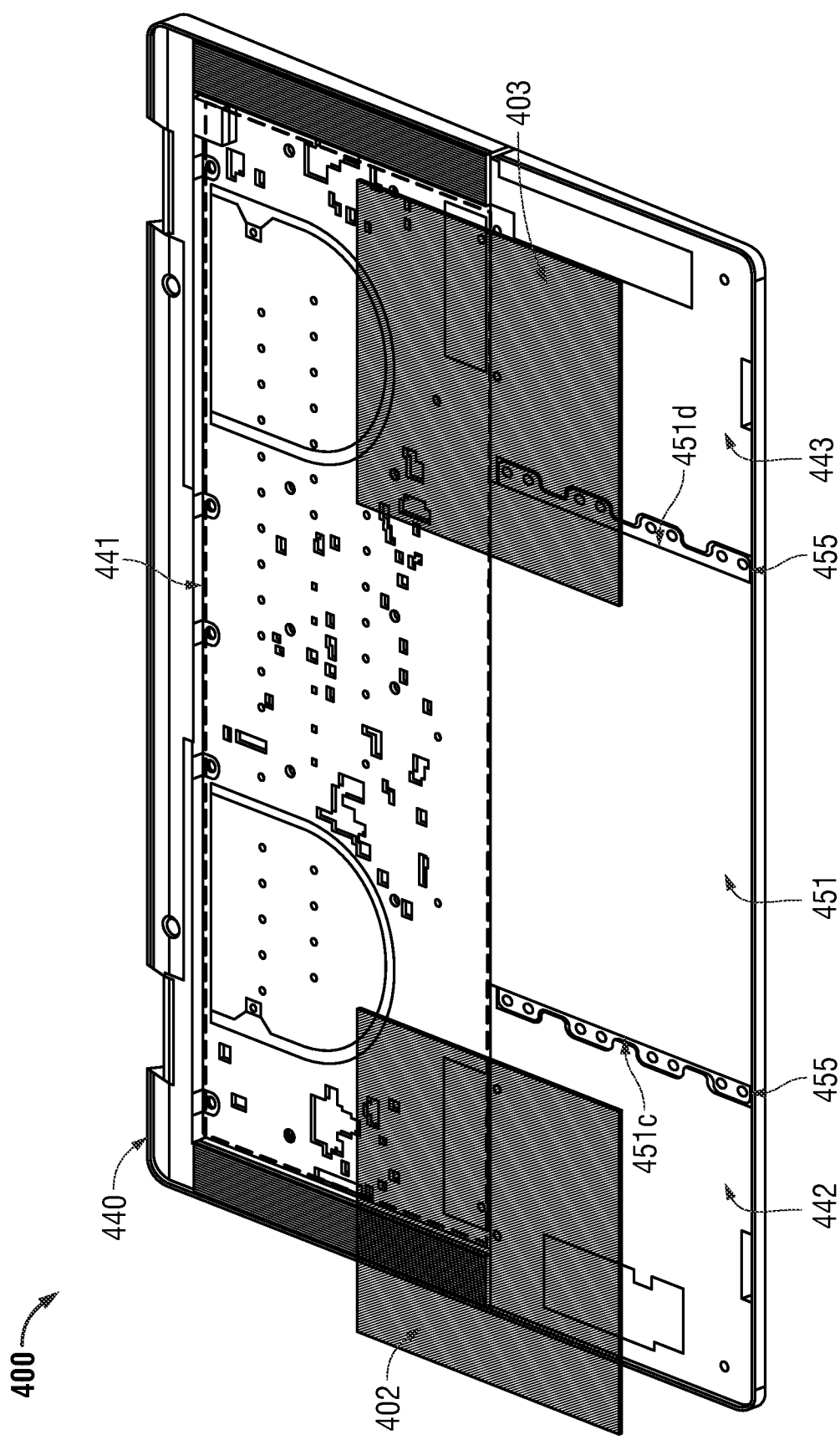
FIG. 4E is a graphical diagram illustrating a perspective view of a touchpad and palm rest with a top portion base chassis assembly according to an embodiment of the present disclosure.

FIG. 4E is a graphical diagram illustrating a perspective view of a touchpad and palm rest base chassis assembly incorporating palm rest surface panels in an information handling system base chassis 400 according to an embodiment of the present disclosure. As described herein, the support bracket 455 may be operatively coupled to the base chassis upper portion 440 such that the manufacturer may align the touchpad surface panel left edge 451c with the right edge of the left palm rest surface panel 402, and align the touchpad surface panel right edge 451d with the left edge of the right palm rest surface panel 403. The manufacturer may also adjust the location of the touchpad surface panel 451 and support bracket 455 to ensure the rear edge of the touchpad surface panel 451 (e.g., 451b of FIG. 4C) aligns with the front edge of the keyboard opening 441 within the base chassis upper portion 440, where the keyboard may be later inserted. For example, in some embodiments, a camera calibration method such as charge coupled device (CCD) camera alignment may be used to perform such alignments.

Once the position of the touchpad surface panel 451 with respect to the base chassis upper portion 440 in an embodiment has been finalized and fixed in place via the top-mounted fasteners (e.g., 461 and 462 of FIGS. 4C and 4D), the left palm rest surface panel 402 may be operatively connected to the left palm rest support surface 442 of the base chassis upper portion 440, and the right palm rest surface panel 403 may be operatively connected to the right palm rest support surface 443 of the base chassis upper portion 440, to form the touchpad and palm rest base chassis assembly 490 in an information handling system base chassis 400. In other embodiments, top mounted screws 461 and 462 may be used to operably couple the support bracket 455 to the base chassis upper portion 440 as well. In still other embodiments, fastening with such techniques as adhesives or magnets are also contemplated.

Figure 4F:
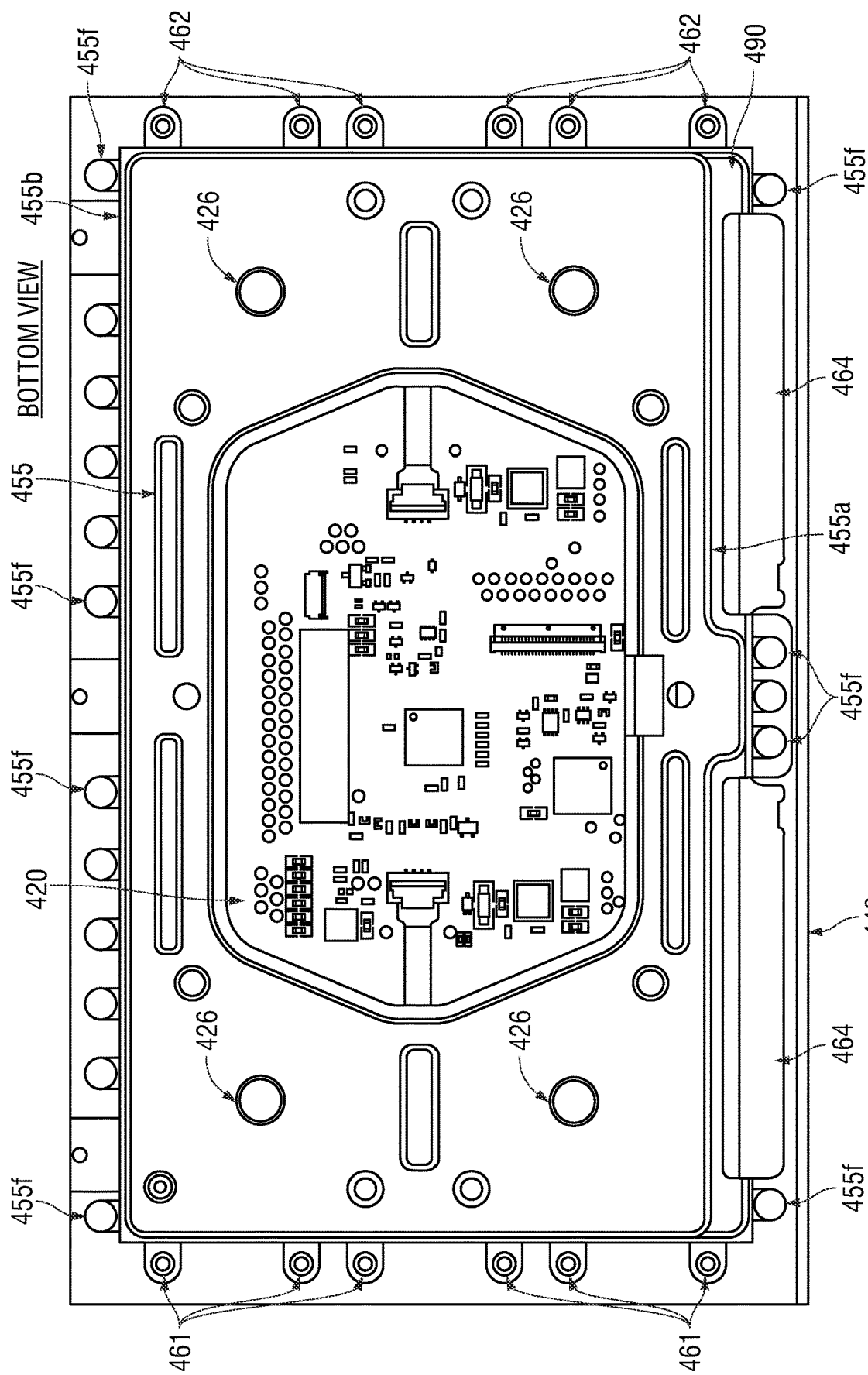
FIG. 4F is a graphical diagram illustrating a bottom view of a support bracket of a haptic touchpad assembly mechanically and operatively coupled to a base chassis upper portion according to an embodiment of the present disclosure.

FIG. 4F is a graphical diagram illustrating a bottom view of a support bracket of a haptic touchpad assembly 490 mechanically and operatively coupled to a base chassis upper portion via bottom-mounted fasteners according to an embodiment of the present disclosure. Once the position of the touchpad surface panel with respect to the base chassis upper portion 440 has been finalized, as described in greater detail in embodiments herein including the previous FIG. 4E, the support bracket 455 of the haptic touchpad assembly 490 (e.g., including the touchpad PCBA 420 and piezo actuator assemblies 426) may be immovably and mechanically and operatively coupled so that it is mechanically fixed to the base chassis upper portion 440 to ensure that the touchpad surface panel remains aligned with the palm rest surface panels, the front boundary of the base chassis upper portion 440, and the front edge of the keyboard opening within the base chassis upper portion 440 in some embodiments. For example, the support bracket 455 may be mounted and further fixed to the base chassis upper portion 440 via a series of bottom-mounted fasteners inserted within clearance openings 455f machined into the base chassis upper portion 440 following the insertion of the top-mounted side fasteners 461 and 462. The fastener openings 455f may be situated along the portions of the base chassis upper portion 440 nearest the support bracket rear edge 455b and the support bracket front edge 455a, and may have hardware such as threaded nuts, posts, or bushings inserted therewithin, for operable connection to a bottom-mounted screw or fastener. In other embodiments, the fastener openings 455f may be situated along either side (e.g., left or right) of the base chassis upper portion 440. These openings 455f may be threaded, to inhibit further movement of the support bracket 455 with respect to the base chassis upper portion 440 upon finalization of the location of the haptic touchpad assembly as described in greater detail herein.

As described herein, although the top surface of the haptic touchpad assembly may extend to the front edge of the base chassis upper portion 440 in an embodiment, underlying layers of the haptic touchpad assembly (e.g., situated behind the support bracket 455 and including piezos 426 and touchpad PCBA 420) may be set back from the front edge of the base chassis upper portion 440 to provide an open area for insertion of a radiofrequency (RF) antenna. The portions of the haptic touchpad assembly situated in FIG. 4F behind the support bracket 455 and including the support bracket 455 may cause interference or inhibit transmission of RF signals, while the touchpad surface panel may be RF-transparent. Thus, the area where a portion of the touchpad surface panel extends beyond the support bracket 455 toward the front edge of the base chassis upper portion 440 may form one or more RF transparent zones 464.

Figure 4G:
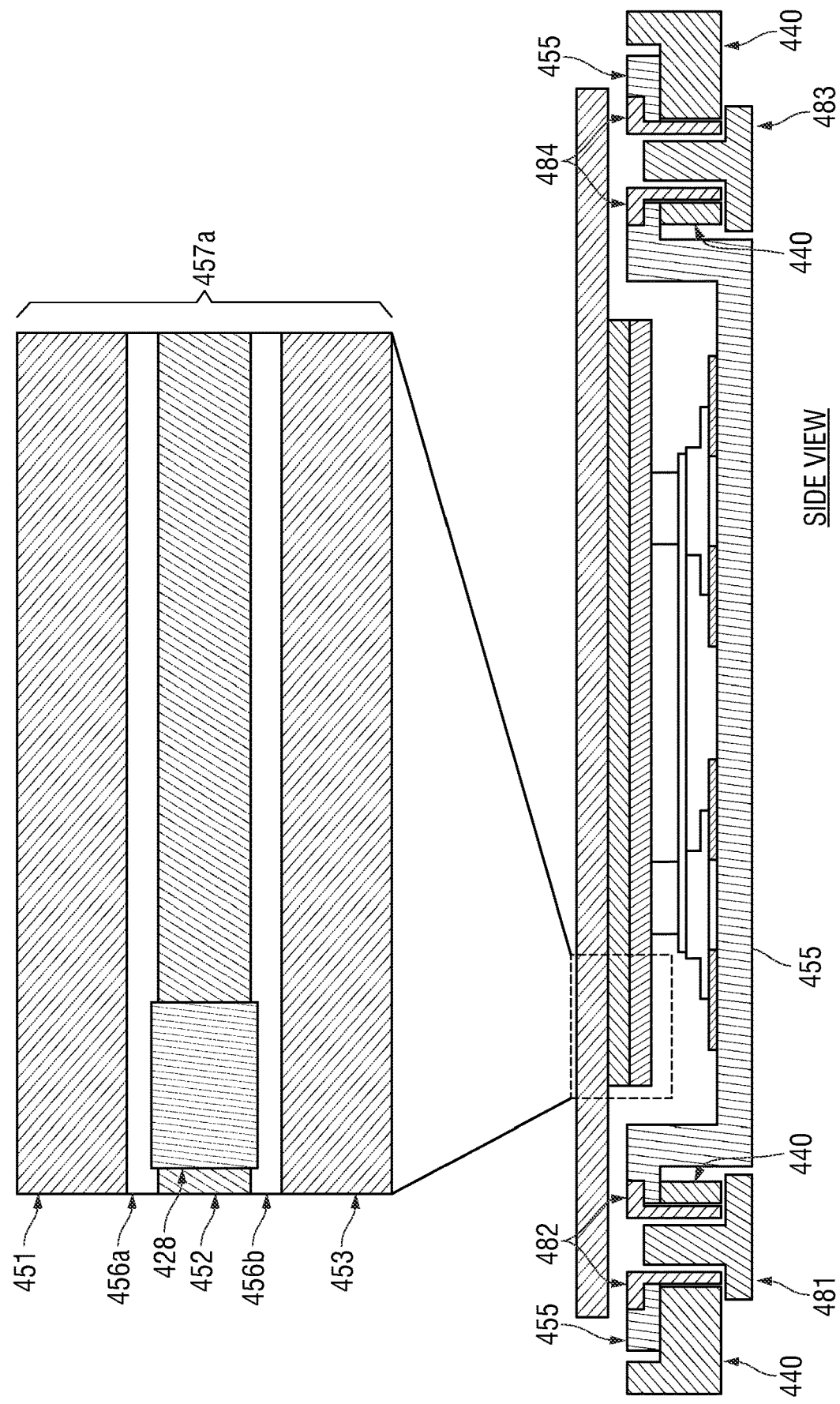
FIG. 4G is a graphical diagram illustrating a side cross-sectional view of a haptic touchpad assembly mechanically and operatively coupled to a base chassis upper portion via bottom-mounted fasteners according to an embodiment of the present disclosure.

FIG. 4G is a graphical diagram illustrating a side cross-sectional view of a haptic touchpad assembly mechanically and operatively coupled to a base chassis upper portion via bottom-mounted fasteners for alignment with palm rest surface panels according to an embodiment of the present disclosure. As described herein, the support bracket 455 may be mounted and immovably fixed to the base chassis upper portion 440 via a series of bottom-mounted fasteners (e.g., 481 and 483) inserted within threaded bushings 482 and 484, respectively, which may be operably connected to the base chassis upper portion 440 in some embodiments. The threaded bushings 482 (or threaded posts or nuts, for example) may correspond to machined clearance openings (e.g., 455f of FIG. 4F) situated along the portions of the base chassis upper portion 440 nearest the support bracket rear edge 455b to receive a fastener (e.g., threaded screw) in some embodiments. The threaded bushings 484 may be inserted within machined clearance openings (e.g., 455f of FIG. 4F) situated along the portions of the base chassis upper portion 440 nearest the support bracket front edge 455a in some embodiments to receive a fastener (e.g., threaded screw). These bushings 482 and 484, respectively, may be threaded, to inhibit further movement of the support bracket 455 with respect to the base chassis upper portion 440 upon finalization of the location of the haptic touchpad assembly as described in greater detail herein.

FIG. 4G also provides a view of a portion of the haptic touchpad assembly, including the touchpad stack 457a, which may comprise the lightguide layer 452 operatively connected to the touchpad surface panel 451 and to the touchpad printed circuit board assembly (PCBA) 453 including a capacitive touch sensor array on a top side of PCBA 453 in some embodiments. In one embodiment, one or more sensors of a capacitive touch sensor array communicatively coupled to the touchpad PCBA 453 (e.g., as described in greater detail with respect to FIG. 2) may also be attached to the touchpad surface panel 451 in position under the touchpad surface panel 451 including beneath light emitting icons of the touchpad surface panel 451 (e.g., as described in greater detail with respect to FIG. 3) to accept user touch input to control the respective functions of each icon in other embodiments.

A sheet-like part of fiberglass material may be impregnated with polycarbonate material to form a laminate sheet of the substrate of composite substrate of woven glass fiber impregnated with polycarbonate material 451 in an embodiment. The substrate of composite substrate of woven glass fiber impregnated with polycarbonate material 451 in an embodiment may include from 3 to 5 layers of woven fiberglass material present in an amount from 40% to 70% by volume fiber content, alternatively 32% by volume fiber content. In other embodiments, the woven fiberglass material may be present in an amount less than 40% by volume fiber content or greater than 70% by volume fiber content. Any suitable type of woven fiberglass may be employed (e.g., such as plain weave or twill).

In one example embodiment, the substrate of composite substrate of woven glass fiber impregnated with polycarbonate material 451 may be impregnated with 30% to 60% by volume polycarbonate polymer which may include recycled polycarbonate polymer. In an embodiment, the substrate of composite substrate of woven glass fiber impregnated with polycarbonate material 451 may have a stiffness provided by a flexural modulus of from 10 to 25 gigapascals (GPa), for example. It will be understood that the above characteristics of the substrate of composite substrate of woven glass fiber impregnated with polycarbonate material 451 are exemplary only, and that in other embodiments, the amount of thermoplastic fiberglass material in the composite may be more or less than 32% by volume, and the amount of polycarbonate polymer may be more than 60% or less than 30% by volume. Moreover, the stiffness or flexural modulus of substrate of composite substrate of woven glass fiber impregnated with polycarbonate material 451 may be less than 10 GPa or greater than 25 GPa. Examples of suitable woven glass fiber impregnated with polycarbonate materials may include, for example, an impregnated thermoplastic fiberglass composite material that includes multiple layers of fiberglass material and that is available as a GF9xIP from InnoPeak Advanced Materials of Taichung, Taiwan.

The substrate of composite substrate of woven glass fiber impregnated with polycarbonate material 451 in an embodiment may be screen printed (e.g., such as with different color layers of ink or other printed material, or printed effects such as mica, sparkle, etc.,) to form lettering, number, or other indicia such as described in relation to FIG. 3 at 301. A UV molding process may be employed in an embodiment to create UV molding features (e.g., using polyurethan acrylate) that may include multiple different finishes or textures. In some embodiments, the substrate of composite substrate of woven glass fiber impregnated with polycarbonate material 451 may be sprayed with an anti-smudge coating, such as PPG EC1103-D TM available from PPG Industries, Inc.® of Pittsburgh, Pennsylvania.

The touchpad surface panel 451 in an embodiment may be operatively connected to the lightguide layer 452 via an upper adhesive 456*a*, so as to position one or more light emitting diodes (LEDs) 428 between the touchpad surface panel 451 and the touchpad PCBA 453, which may control operation of the LEDs 428 (e.g., as described in greater detail above with respect to FIG. 2). The LEDs 428 in an embodiment may be coupled to the touchpad PCBA 453 so as to align with openings etched within the lightguide layer 452. An opening may be etched within the light guide layer 452 for insertion of the LED 428 between the upper and lower adhesive layers 456*a* and 456*b*, respectively. Such an opening in various embodiments may be etched using chemical etching, acid deposition, or machining, for example. The lightguide layer 452 in an embodiment may direct light emitted from the LED 428 toward one or more inked icon openings within the touchpad surface panel 451 such that the icons are light-illuminated for touch-selection by the user via the touchpad surface panel 451.

The LEDs (e.g., 428) in an embodiment may be operably connected to the PCBA 453 via soldering, for example. This may allow the PCBA 453 to direct operation of the LED 428 in an embodiment. In one embodiment, a capacitive touch sensitive sensor array may be operatively coupled to an underside of the touchpad surface panel 451. The lightguide layer 452 may be fixed to the touchpad PCBA 453 via the lower adhesive 456*b*. In other embodiments, the capacitive touch sensor array may be on a top surface of the PCBA 453.

Figure 4H:
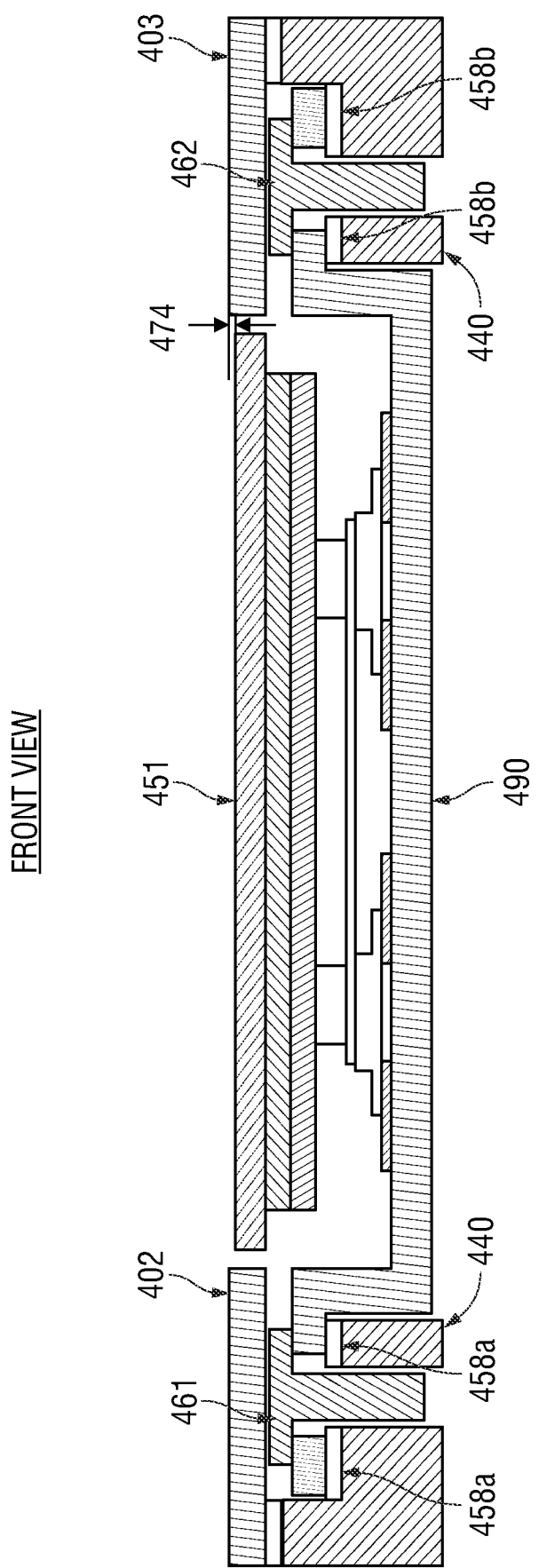
FIG. 4H is a graphical diagram illustrating a front cross-sectional view of a haptic touchpad assembly mechanically and operatively coupled to a base chassis upper portion using shims according to an embodiment of the present disclosure.

FIG. 4H is a graphical diagram illustrating a front cross-sectional view of a haptic touchpad assembly 490 mechanically and operatively coupled to a base chassis upper portion using shims for vertical alignment with palm rest surface panels according to an embodiment of the present disclosure. As described herein, the haptic touchpad assembly 490 in an embodiment may be operatively coupled to the base chassis upper portion 440 to allow the manufacturer to adjust the location of the touchpad surface panel 451 such that it is aligned with the edges of the palm rest surface panels 402 and 403. This may also allow the manufacturer to gauge any horizontal position as well as vertical displacement (e.g., 473 of FIG. 4B) between the touchpad surface panel 451 and the palm rest surface panels 402 and 403 prior to finally fixing these structures in place. For example, in some embodiments, a camera calibration method such as charge coupled device (CCD) camera alignment may be used to perform such alignments. To increase aesthetics, such a vertical displacement (e.g., 473 of FIG. 4B) may be minimized as much as possible in order to also minimize the vertical displacement 474 distance shown in FIG. 4H. giving the three-panel touchpad and palm rest base chassis assembly the appearance of a near-seamless single sheet of glass. If the vertical displacement (e.g., 473 of FIG. 4B) is above a maximum tolerance (e.g., 0.25 mm), a shim 458*a* may be placed between the support bracket of the haptic touchpad assembly 490 and the base chassis upper portion 440, and a shim 458*b* may be placed between the support bracket of the haptic touchpad assembly 490 and the base chassis upper portion 440, to push the touchpad surface panel 451 upward and closer to the left and right palm rest surface panels 402 and 403.

Figure 4I:
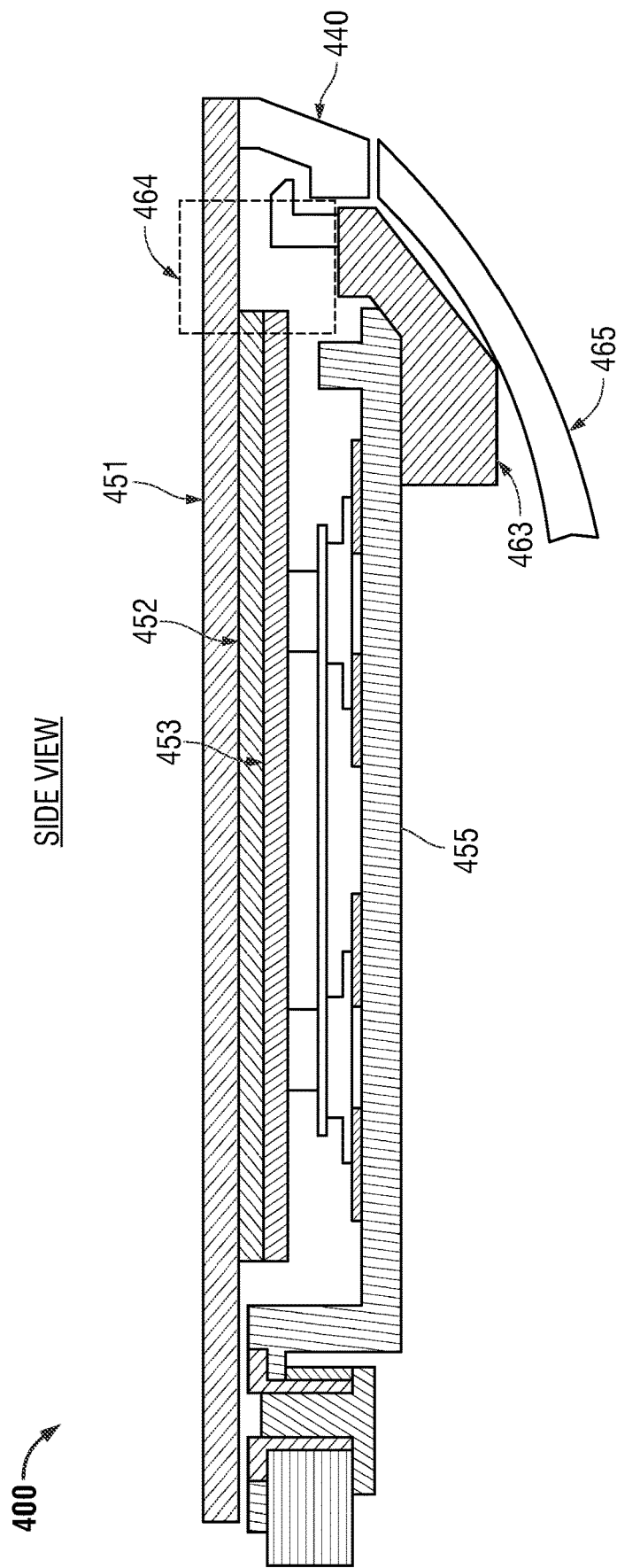
FIG. 4I is a graphical diagram illustrating a side cross-sectional view of a radiofrequency (RF) transparent zone within the base chassis according to an embodiment of the present disclosure.

FIG. 4I is a graphical diagram illustrating a side cross-sectional view of a haptic touchpad assembly mechanically and operatively coupled to a base chassis upper portion 440 to create a radiofrequency (RF) transparent zone within the information handling system base chassis 400 for transceiving of data via an antenna disposed within the information handling system base chassis according to an embodiment of the present disclosure. As described herein, because the polycarbonate impregnated composite substrate of woven glass fiber comprising the touchpad surface panel 451 has greater durability than traditional glass panels, the edges of the touchpad surface panel 451 may extend to the front edge or boundary of the base chassis upper portion 440 that may be vertical walls of a metallic material or other material forming a tray for insertion of the touchpad surface panel 451 and palm rests (e.g., as inlays as described in greater detail with respect to FIG. 4K) without encountering the durability concerns encountered when using a glass panel or at interfaces with palm rest panels or a keyboard. Moreover, the composite substrate of woven glass fiber may be radiofrequency transparent in portions where this front edge or boundary of the base chassis upper portion 440 are located.

Although the top surface panel 451 of the haptic touchpad assembly may extend to the front edge of the base chassis upper portion 440 in an embodiment, underlying layers of the haptic touchpad assembly (e.g., lightguide layer 452, lightguide printed circuit board assembly (PCBA) 453, and support bracket 455) may be set back from the front edge of the base chassis upper portion 440 to provide an open area for insertion of a radiofrequency (RF) antenna 463 within a RF transparent zone 464. The support bracket 455, or portions of touchpad PCBA 453 in an embodiment may cause interference or inhibit transmission of RF signals, while the touchpad surface panel 451 may be RF-transparent. Thus, the area where a portion of the touchpad surface panel 451 extends beyond the support bracket 455, and the touchpad PCBA 453 toward the front edge of the base chassis upper portion 440 may form one or more RF transparent zones 464.

An RF antenna 463 in an embodiment may be mounted at least partially within or beneath this RF transparent zone 464, and may be enclosed within an RF-transparent base chassis lower portion 465 (e.g., comprising an RF-transparent plastic). The base chassis lower portion 465 may further house other components and may be joined to the base chassis upper portion 440 to enclose the components of the information handling system described with respect to FIG. 1 above, including the hardware processor 101, the memory 102, storage devices 103, and 107, and network interface device 160. The antenna 463 in an embodiment shown in FIG. 4I may correspond to at least one antenna 163 described above with respect to FIG. 1. Many information handling systems employ a plurality of RF antennas (e.g., 463) for communication in more than one communication standard or frequency range (e.g., WWAN, WLAN, Bluetooth®, NFC). In some cases, placement of multiple antennas (e.g., including 463) may be challenging based on space considerations or interference issues (e.g., several antennas situated toward the rear of the base chassis upper portion 440). Thus, there is a need to place antennas (e.g., 463) at various locations of an information handling system base chassis 400 or at a display chassis. Locations nearest the edges of the base chassis provide another location for good RF access and provides an additional location while allowing antenna interference to be avoided from other antennas or obstruction or interference causing components within the base chassis 400. Because the touchpad surface panel 451 in embodiment employs a polycarbonate impregnated composite substrate of woven glass fiber that is RF-transparent, antenna 463 may now be placed on the front edge of the base chassis upper portion 440, located at an RF-transparent zone or window 464. This may result in decreased interference between multiple antennas by providing more available locations to form antennas, or the ability to add an additional antenna not previously enclosed within the base chassis in conventional systems.

Figure 4J:
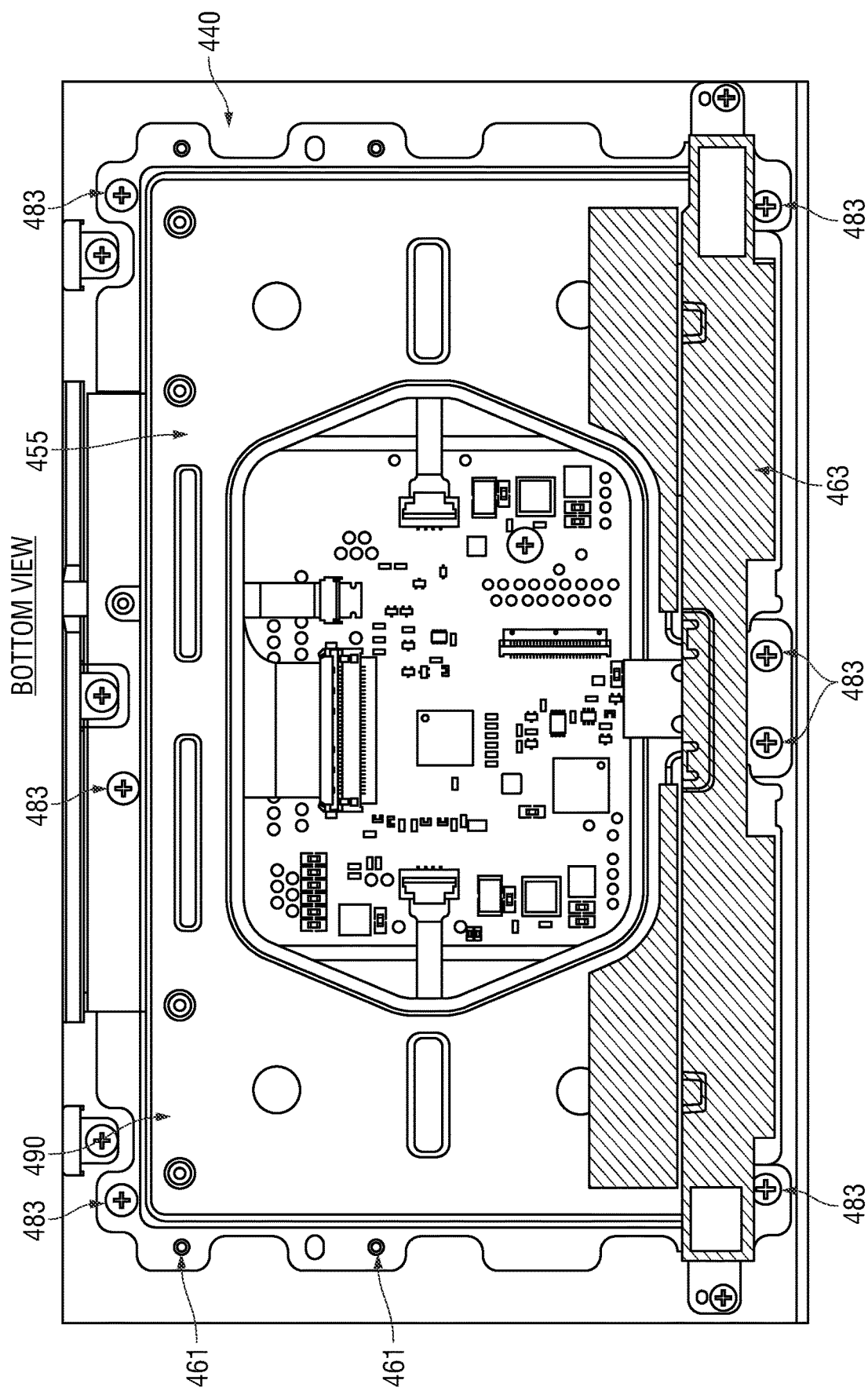
FIG. 4J is a graphical diagram illustrating a bottom view of an antenna disposed beneath a haptic touchpad assembly according to an embodiment of the present disclosure.

FIG. 4J is a graphical diagram illustrating a bottom view of an antenna mechanically and operatively coupled to a base chassis upper portion and disposed at least partially beneath a haptic touchpad assembly 490 according to an embodiment of the present disclosure. As described herein, the support bracket 455 for the haptic touchpad assembly 490 may be operably coupled so that it is mounted to the base chassis upper portion 440 via a series of bottom-mounted fasteners 483 (e.g., screws in some example embodiments, however, adhesives and magnets are also contemplated). In other embodiments, top mounted screws 461 and 462 may be used to operably couple the support bracket 455 to the base chassis upper portion 440 as well. In still other embodiments, fasteners such as adhesives or magnets are contemplated. The RF antenna 463 may then be operably coupled to mounts adjacent to the support bracket 455 and extending at least partially beyond the support bracket 455 toward the front edge of the base chassis upper portion 440. For example, a portion of the RF antenna 463 may be situated within the RF-transparent zone (e.g., 464) described above with respect to FIG. 4I and FIG. 4F.

Figure 4K:
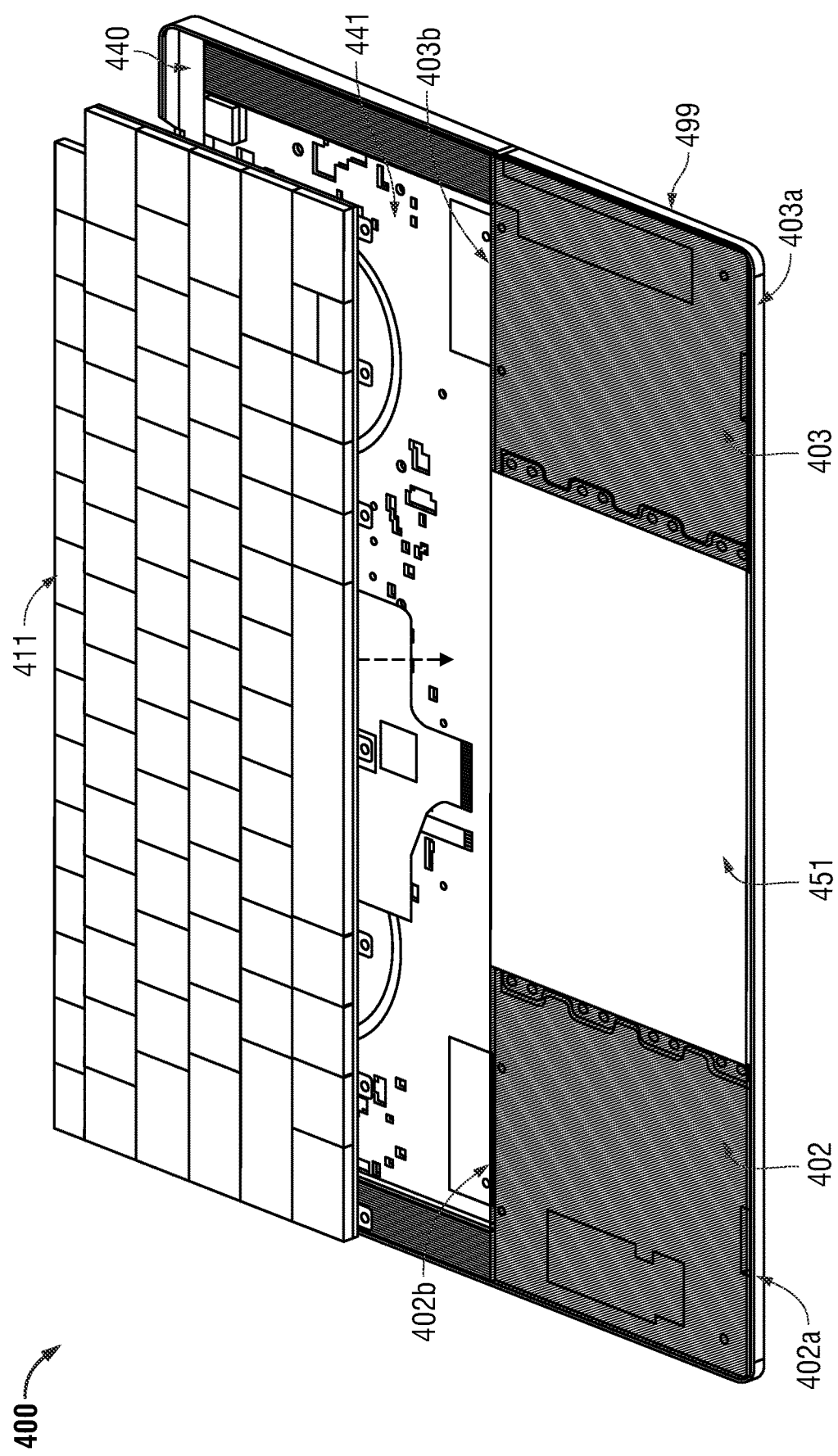
FIG. 4K is a graphical diagram illustrating a perspective view of a touchpad and palm rest with a top portion base chassis assembly for insertion of a keyboard according to an embodiment of the present disclosure.

FIG. 4K is a graphical diagram illustrating a perspective view of a touchpad and palm rest assembly in an information handling system base chassis including insertion of a keyboard operably coupled to a touchpad printed circuit board (PCBA) according to an embodiment of the present disclosure. Keyboard 411 may be inserted within the keyboard opening 441 of the base chassis upper portion 440. As described herein, the manufacturer may adjust the position of the touchpad surface panel 451, due to the top-mounted method of operably coupling the haptic touchpad assembly to the base chassis upper portion 440 such that it is moveable before final mounting. As described in greater detail with respect to FIGS. 4E and 7, the manufacturer may adjust the location of the touchpad surface panel 451 to ensure the rear edge of the touchpad surface panel 451 aligns with the front edge of the keyboard opening 441 relative to a user location and aligns with the rear edge 402b of the left palm rest surface panel 402 and the rear edge 403b of the right palm rest surface panel 403. The touchpad surface panel 451 may also be adjusted to ensure horizontal and vertical alignment of the touchpad surface panel 451 as well as front edge alignment with the left palm rest surface panel front edge 402a and the right palm rest surface panel front edge 403a. For example, in some embodiments, a camera calibration method such as charge coupled device (CCD) camera alignment may be used to perform such alignments.

Keyboard 411 in an embodiment may be operably coupled to the touchpad printed circuit board assembly (PCBA) of the haptic touchpad assembly (e.g., as described above with respect to FIG. 2). In some embodiments, the outer boundaries of the base chassis upper surface 440 may be defined by vertical walls 499 of a metallic material, such as aluminum, for example. These vertical walls 499 may surround the front edge of the touchpad surface panel 451, the left palm rest surface panel front edge 402a, the right palm rest surface panel front edge 403a, the left edge of the left palm rest surface panel 402, the right edge of the right palm rest surface panel 403, so as to form a tray for insertion of the left palm rest surface panel 402, the right palm rest surface panel 403, and the touchpad surface panel 451.

Figure 4L:
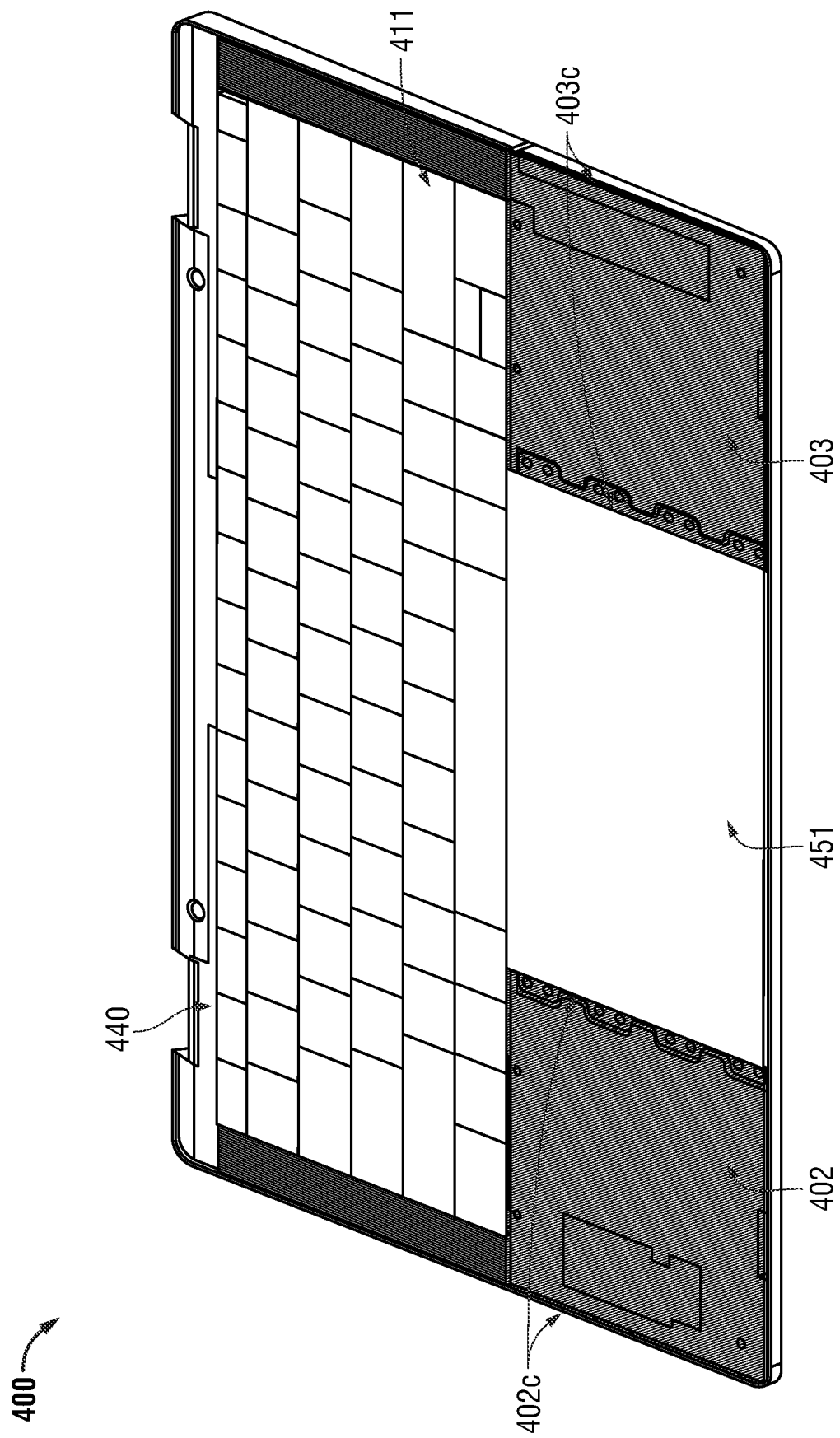
FIG. 4L is a graphical diagram illustrating a perspective view of palm rest surface panels and a touchpad surface panel aligned with a base chassis upper portion according to an embodiment of the present disclosure.

FIG. 4L is a graphical diagram illustrating a perspective view of a touchpad and palm rest assembly of an information handling system base chassis 400 incorporating palm rest surface panels and a touchpad surface panel aligned to form outer boundaries of the base chassis upper portion according to an embodiment of the present disclosure. As described herein, the manufacturer may adjust the position of the touchpad surface panel 451, due to the top-mounted method of operably coupling the haptic touchpad assembly to the base chassis upper portion 440 such that it is moveable before final mounting. For example, the manufacturer may adjust the location of the touchpad surface panel 451 to ensure the left edge of the touchpad surface panel 451 aligns with the right side edge 402c of the left palm rest surface panel 402, and the right edge of the touchpad surface panel 451 aligns with the left side edge 403c of the right palm rest surface panel 403. For example, in some embodiments, a camera calibration method such as charge coupled device (CCD) camera alignment may be used to perform such alignments.

As also described herein, the three-panel haptic touchpad and palm rest assembly in an embodiment of the information handling system base chassis 400 may provide an aesthetically pleasing and durable three-panel upper surface that is near-seamless, with exterior edges defining the outer boundary of the base chassis upper portion 440. The three panels may be comprised of the same polycarbonate impregnated composite substrate of woven glass fiber that provides a glass-like texture and may increase the surface area and "clickable" area of the touchpad surface in comparison to the windowed island design used in conventional solutions as well as aesthetically allow for elimination of the windowed island design. The touchpad surface panel 451 and both the right and left palm rest surface panels 402 and 403 neighboring the touchpad surface panel 451 may form the three near-seamless panels, which may also extend away from the user toward the keyboard 411. Because a polycarbonate impregnated composite substrate of woven glass fiber has greater durability than traditional glass panels, the edges of the touchpad surface panel 451 and neighboring palm rests 402 and 403 may extend to the outer borders of the base chassis upper portion 440 without encountering the durability concerns encountered when using a glass panel. Further, the left and right palm rest surface panels 402 and 403 in an embodiment may be fixed to the base chassis upper portion 440 so as to conceal the top-mounted side screws used to fix the touchpad surface panel 451 to the base chassis upper portion 440 of the information handling system base chassis 400. This design may provide a glass-like finish across the majority of the base chassis upper portion (e.g., the touchpad and palm rest surfaces) of uniform texture that extends to the front, left, and right outer boundaries of the base chassis upper portion and to the bottom edge of the keyboard. It further provides one or more RF-transparent zones to increase available locations for RF antennas on the information handling system base chassis 400.

Figure 5:
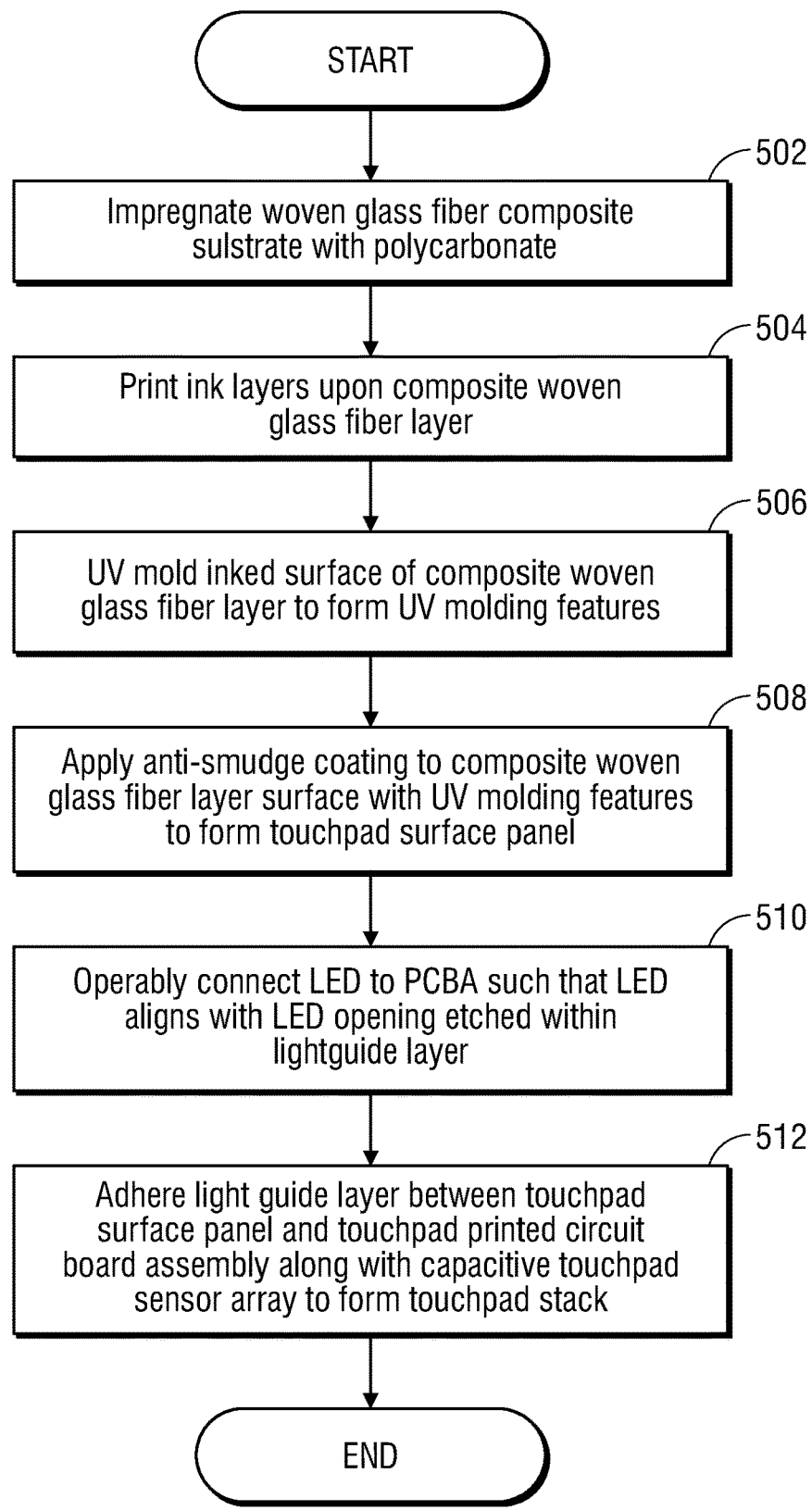
FIG. 5 is a flow diagram illustrating a method of operatively connecting a light emitting diode (LED) to a touchpad PCBA and a touchpad surface panel according to an embodiment of the present disclosure.

FIG. 5 is a flow diagram illustrating a method of operatively connecting a light emitting diode (LED) and touchpad printed circuit board assembly (PCBA) to a substrate of composite substrate of woven glass fiber impregnated with polycarbonate material to form a touchpad surface panel according to an embodiment of the present disclosure. As described herein, the use of composite substrate of woven glass fibers (e.g., thermoplastics) impregnated with polycarbonate material as the base chassis upper portion or the upper surface of the touchpad in an embodiment may address the durability and aesthetics issues presented by these conventional designs. Such polycarbonate impregnated composite substrate of woven glass fibers in an embodiment may also enable light diffusion throughout its thickness, allowing for emission of light through the touchpad surface panel to illuminate one or more touch icons.

At block 502, a fiberglass layer may be impregnated with a polycarbonate material in an embodiment. For example, in an embodiment described with respect to FIG. 4G, a sheet-like part of fiberglass material may be impregnated with polycarbonate material to form a laminate sheet of the substrate of composite substrate of woven glass fiber impregnated with polycarbonate material 451 in an embodiment. The substrate of composite substrate of woven glass fiber impregnated with polycarbonate material 451 in an embodiment may be impregnated with 30% to 60% by volume polycarbonate polymer which may include recycled polycarbonate polymer in one example embodiment. In one embodiment, the substrate of composite substrate of woven glass fiber impregnated with polycarbonate material 451 may have a stiffness provided by a flexural modulus of from 10 to 25 gigapascals (GPa), for example.

An ink layer may be printed upon the substrate of composite substrate of woven glass fiber impregnated with polycarbonate material in an embodiment at block 504. For example, the substrate of composite substrate of woven glass fiber impregnated with polycarbonate material 451 in an embodiment may be screen printed (e.g., such as with different color layers of ink or other printed material, or printed effects such as mica, sparkle, etc.,) to form lettering, number, or other indicia. More specifically, as described in an embodiment with respect to FIG. 3, such an ink layer may be used to screen print the light-emitting icons 301, as either positive or negative space.

At block 506 in an embodiment, the inked surface of the substrate of composite substrate of woven glass fiber impregnated with polycarbonate material may be UV molded to form UV molding features. For example, in an embodiment described with respect to FIG. 4G, a UV molding process may be employed in an embodiment to create UV molding features (e.g., using polyurethan acrylate) that may include multiple different finishes or textures.

The UV-molded inked surface of the substrate of composite substrate of woven glass fiber impregnated with polycarbonate material in an embodiment may also by sprayed with an anti-smudge coating at block 508. For example, in some embodiments, the substrate of composite substrate of woven glass fiber impregnated with polycarbonate material 451 may be sprayed with an anti-smudge coating, such as PPG EC1103-D TM available from PPG Industries, Inc.® of Pittsburgh, Pennsylvania.

At block 510, one or more light emitting diodes (LEDs) may be operably coupled to the touchpad PCBA in an embodiment. The LEDs in an embodiment may be formed in or coupled to the touchpad PCBA so as to align with openings etched within a lightguide layer designed for adherence to the PCBA and to the touchpad surface panel as part of the PCBA for electrical coupling. For example, an LED opening may be etched within the lightguide layer and as part of the PCBA, as described in an embodiment with respect to FIG. 4G. More specifically, an opening may be etched within the light guide layer 452 for location of the LED 428 between the upper and lower adhesive layers 456a and 456b, respectively. Such an opening in various embodiments may be etched using chemical etching, acid deposition, or machining, for example. The LEDs (e.g., 428) in an embodiment may be operably connected to the PCBA 453 via forming the LEDs within the PCBA, or by soldering, in some examples. This may allow the PCBA 453 to direct operation of the LED 428 in an embodiment.

At block 512 in an embodiment, the light guide layer 452 in an embodiment may be adhered between the touchpad surface panel and the touchpad PCBA to form the touchpad stack. For example, the touchpad surface panel 451 in an embodiment may be operatively connected to the lightguide layer 452 via an upper adhesive 456a, so as to position one or more light emitting diodes (LEDs) 428 operably connected to the PCBA 453 between the touchpad surface panel 451 and the touchpad PCBA 453. One or more LEDs 428 may be situated within openings of the lightguide layer 452, between the touchpad surface panel 451 and the touchpad PCBA 453, which may control operation of the LEDs 428 (e.g., as described in greater detail above with respect to FIG. 2). The lightguide layer 452 in an embodiment may direct light emitted from the LED 428 toward one or more inked icon openings within the touchpad surface panel 451 such that the icons are light-illuminated for touch-selection by the user via the touchpad surface panel 451. The lightguide layer 452 may be fixed to the touchpad PCBA 453 via the lower adhesive 456b. In one embodiment, a capacitive touch sensitive sensor array may be operatively coupled to an underside of the touchpad surface panel 451. In other embodiments, the capacitive touch sensor array may be on a top surface of the PCBA 453. The method for forming or operatively connecting an LED and touchpad PCBA into a substrate of composite substrate of woven glass fiber impregnated with polycarbonate material to form a touchpad surface panel may then end.

Figure 6:
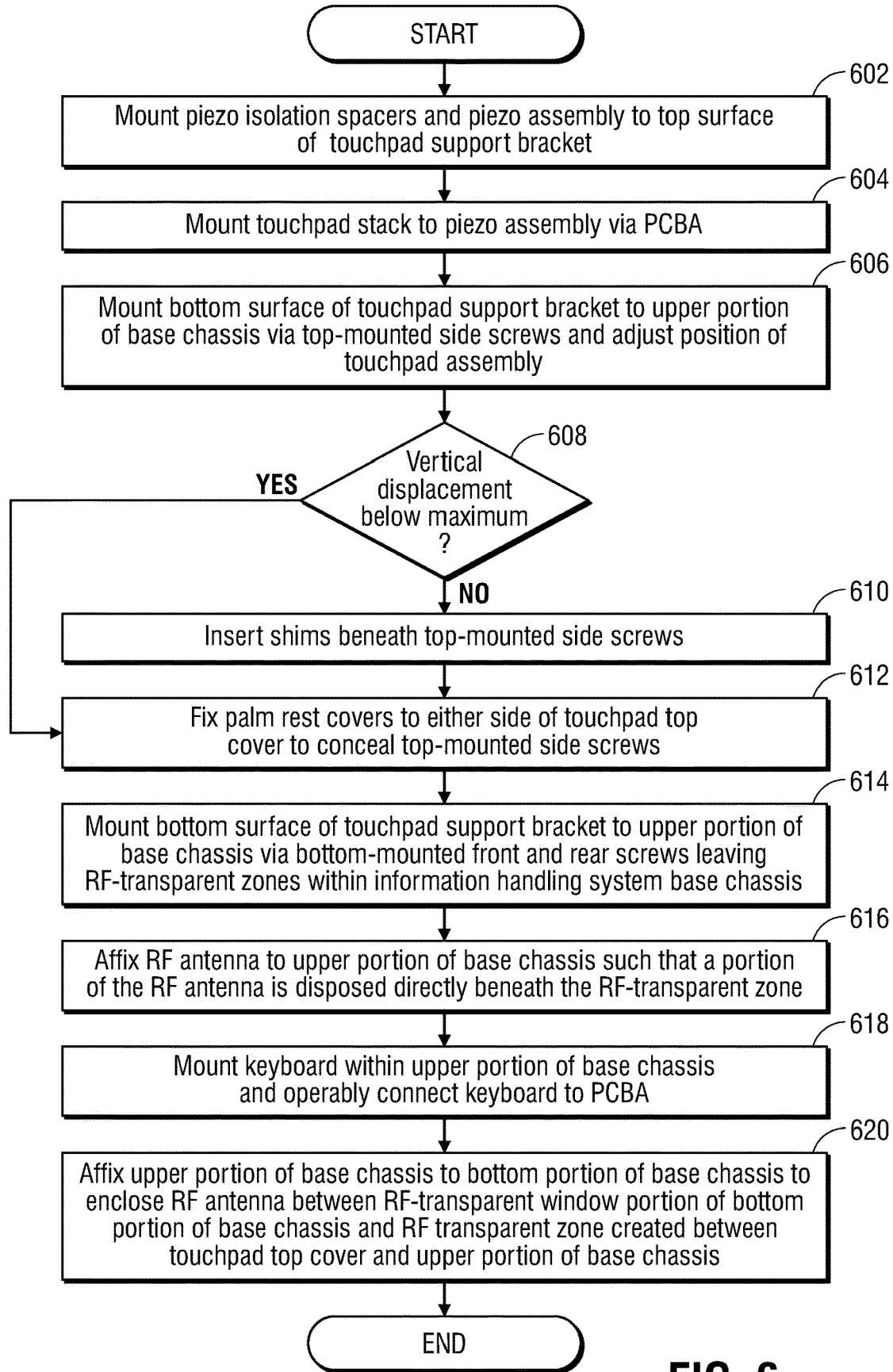
FIG. 6 is a flow diagram illustrating a method of mounting a haptic touchpad assembly to a base chassis upper portion to form a three-panel touchpad and palm rest base chassis assembly according to an embodiment of the present disclosure.

FIG. 6 is a flow diagram illustrating a method of top-mounting a haptic touchpad assembly to a base chassis upper portion in alignment with palm rest surface panels to form a three-panel touchpad and palm rest assembly for an information handling system base chassis according to an embodiment of the present disclosure. As described herein, the three-panel haptic touchpad and palm rest assembly in an embodiment may provide an aesthetically pleasing and durable three-panel upper surface with exterior edges extending to metallic vertical walls defining the outer boundary or with the palm rest panels extending as exterior edges defining the outer boundary of the information handling system base chassis upper portion in various embodiments. The three panels may be comprised of the same polycarbonate impregnated composite substrate of woven glass fiber that provides a glass-like texture and allow for base chassis designs other than the windowed island design or thickened and reinforced touchpad stack of some conventional chasses. The touchpad surface panel and both the right and left palm rest surface panels neighboring the touchpad surface panel may form the three panels, which may also extend away from the user toward the keyboard. Because a polycarbonate impregnated composite substrate of woven glass fiber has greater durability than traditional glass panels, the edges of the touchpad surface panel and neighboring palm rests may extend to the keyboard as well as to the outer borders or to vertical walls, such as an aluminum or other material band as outer borders of the base chassis upper portion without encountering the durability concerns encountered when using a glass panel. This design may provide a near-seamless glass-like finish across the majority of the base chassis upper portion (e.g., the touchpad and palm rest surfaces) of uniform texture that extends to the front, left, and right outer boundaries of the base chassis upper portion and to the bottom edge of the keyboard in the information handling system base chassis.

In order to ensure close alignment between the touchpad upper surface and the palm rest upper surfaces (e.g., minimizing any gaps between these structures to provide a more seamless appearance), the three-panel design may involve mounting the haptic touchpad assembly from the top of the information handling system base chassis, rather than the bottom-mounted touchpad dive-board assembly method used in conventional systems. In an embodiment, the touchpad may be inserted downward into an opening of the base chassis upper portion. The position of the haptic touchpad assembly may be adjusted to ensure the front edge and the rear edge of the haptic touchpad assembly are aligned with the front edge and the rear edge of the neighboring palm rest surface panels. For example, in some embodiments, a camera calibration method such as charge coupled device (CCD) camera alignment may be used to perform such alignments. Vertical gaps between the top surface of the touchpad and the top surfaces of the palm rest panels may also be adjusted or removed by insertion of shims between the support bracket of the haptic touchpad assembly and the base chassis upper portion, if needed. The touchpad may be mounted to the base chassis upper portion by inserting top-mounted screws into machined and threaded clearance openings within a support bracket mechanically affixed to the touchpad layers and haptics-enabled piezoelectric device assembly. Once these top-mounted screws are in place, the polycarbonate impregnated composite substrate of woven glass fiber panels or other panel materials forming the left and right palm rest may be placed atop the base chassis upper portion so as to conceal the top-mounted screws. The edges of the touchpad with the palm rest panels, the support bracket for the touchpad and piezoelectric device assemblies may be operatively coupled so that it is mechanically fixed to the base chassis upper portion via insertion of bottom-mounted screws within threaded openings and communicatively coupled to other components, such as hardware processors or buses of the information handling system.

At block 602, piezo isolation spacers and a piezoelectric device assembly may be operably coupled to a touchpad support bracket. For example, in an embodiment described with respect to FIG. 4A, touchpad support bracket 455 may be operatively connected to the piezoelectric device assemblies 426. One or more piezo isolation spacers 454 may be situated directly beneath the piezo electric device assemblies 426 to dissipate vibration caused by activation of the piezoelectric device assemblies 426, and to provide electrical isolation between a brass conductive layer of the high voltage piezo and the metallic touchpad support bracket 455.

The touchpad stack including the touchpad surface panel in an embodiment may be mounted to the piezoelectric device assembly via the touchpad printed circuit board assembly (PCBA) at block 604. For example, the piezoelectric device assemblies 426 may be situated along various points beneath the touchpad surface panel 451 such that specific piezo actuators are meant to cause haptic feedback felt by specific portions of the user's hands via the touchpad surface panel and in some embodiments palm rest side panels. The piezoelectric device assemblies 426 in an embodiment may be disposed beneath and mechanically joined to the touchpad PCBA 453 on the surface opposite the lightguide layer 452 and the side having a capacitive touch sensor array, for example.

At block 606, flanges of the bottom surface of the touchpad support bracket may be mounted to an upper portion of the base chassis upper portion via top-mounted side screws to allow for adjustment of the position of the haptic touchpad assembly with respect to the base chassis upper portion, the palm rests, and a keyboard in some embodiments. For example, in an embodiment described with respect to FIG. 4B, in order to ensure close alignment (e.g., left-to-right and front-to-back) between the touchpad surface panel 451 and the palm rest surface panels 402 and 403, respectively (e.g., minimizing any gaps between these structures to provide a more seamless appearance), the haptic touchpad assembly may be mounted within an upper portion of the base chassis 440 from the top, rather than the bottom-mounted touchpad dive-board assembly method used in conventional systems. This may allow the manufacturer to adjust the location of the touchpad surface panel 451 such that it is aligned with the edges of the palm rest surface panels 402 and 403 and any keyboard prior to finally fixing each of these structures (e.g., 455, 402 and 403) in place with respect to the base chassis upper portion 440. For example, in some embodiments, a camera calibration method such as charge coupled device (CCD) camera alignment may be used to perform such alignments.

In another example embodiment described with respect to FIG. 4C, the support bracket 455 in an embodiment may include a plurality of machined clearance openings 455e to either side of the touchpad surface panel 451 for operatively coupling the support bracket 455 to the base chassis upper portion 440, the left palm rest support surface 442, or the right palm rest support surface 443 via top-mounted side fasteners such that it is moveable for adjustment prior to affixing it in place. For example, in another example embodiment described with respect to FIG. 4D, the support bracket 455 in an embodiment may include a support bracket left side 455c operatively coupled to the base chassis upper portion 440 or the left palm rest support surface 442 via top-mounted left-side fasteners 461 and a support bracket right side 455d operatively coupled to the base chassis upper portion 440 or the right palm rest support surface 443 via top-mounted right-side fasteners 462. This may allow the manufacturer to adjust the location of the touchpad surface panel 451 by moving the touchpad surface panel 451 forward, toward the base chassis upper portion front boundary (e.g., 440*a* of FIG. 4C), backward toward the base chassis upper portion rear edge (e.g., 451*b* of FIG. 4C), to the left toward the left palm rest support surface 442, or to the right toward the right palm rest support surface 443 and tighten fasteners 461 and 462 in place upon reaching a desired adjustment. In yet another example embodiment described with respect to FIG. 4E, the support bracket 455 may be operatively coupled to the base chassis upper portion such that the manufacturer may align the touchpad surface panel left edge 451*c* with the right edge of the left palm rest surface panel 402, and align the touchpad surface panel right edge 451*d* with the left edge of the right palm rest surface panel 403. The manufacturer may also adjust the location of the touchpad surface panel and support bracket 455 to ensure the rear edge of the touchpad surface panel (e.g., 451*b* of FIG. 4C) aligns with the front edge of the keyboard opening 441 within the base chassis upper portion 440, where the keyboard may be inserted. For example, in some embodiments, a camera calibration method such as charge coupled device (CCD) camera alignment may be used to perform such alignments.

The manufacturer may determine at block 608 in an embodiment whether the vertical displacement between the top surface of the touchpad surface panel and the right and left palm rest surface panels meets tolerances. For example, in an embodiment described with respect to FIGS. 4C, the top-mounting approach described herein may also allow the manufacturer to gauge any vertical displacement 473 between the touchpad surface panel 451 and the palm rest surface panels 402 and 403 prior to finally fixing these structures in place. The manufacturer may temporarily attach the palm rest surface panels 402 and 403 to the base chassis upper portion 440 in an embodiment to gauge this distance. To increase aesthetics, such a vertical displacement 473 may be minimized as much as possible (e.g., below a preset tolerance of 0.25 mm), giving the three-panel touchpad and palm rest base chassis assembly the appearance of a near-seamless single sheet of glass. If the vertical displacement is too great, the method may proceed to block 610 for insertion of vertical alignment shims between the support bracket of the haptic touchpad assembly and the base chassis upper portion. If the vertical displacement is within tolerances, the method may proceed to block 612 for fixing of the palm rest surface panels to the base chassis upper portion so as to conceal the top-mounted side screws.

At block 610, in an embodiment in which the vertical displacement between the top surface of the touchpad surface panel and the palm rest surface panels exceeds tolerances, shims may be inserted between the support bracket of the haptic touchpad assembly and the base chassis upper portion. For example, as described in an example embodiment with respect to FIG. 4H, if the vertical displacement 473 is above a maximum tolerance (e.g., 0.25 mm), a shim may be placed between the support bracket of the haptic touchpad assembly 490 and the base chassis upper portion 440 and palm rest support surfaces 443 and 443, respectively, to push the touchpad surface panel 451 upward and closer to the left and right palm rest surface panels 402 and 403. The method may then proceed to block 612 for fixing of the palm rest surface panels to the base chassis upper portion so as to conceal the top-mounted side screws.

The palm rest surface panels in an embodiment may be fixed to the base chassis upper portion at block 612. For example, in an embodiment described with respect to FIG. 4E, once the position of the touchpad surface panel 451 with respect to the base chassis upper portion 440 in an embodiment has been finalized, the left palm rest surface panel 402 may be operatively connected to the left palm rest support surface 442 of the base chassis upper portion 440, and the right palm rest surface panel 403 may be operatively connected to the right palm rest support surface 443 of the base chassis upper portion 440, to form the touchpad and palm rest base chassis assembly 400. In another embodiment described with respect to FIG. 4K, for example, the left and right palm rest surface panels 402 and 403 in an embodiment may be fixed to the base chassis upper portion 440 so as to conceal the top-mounted side screws used to fix the touchpad surface panel 451 to the base chassis upper portion 440. This design may provide a glass-like finish across the majority of the base chassis upper portion (e.g., the touchpad and palm rest surfaces) of uniform texture that extends to the front, left, and right outer boundaries of the base chassis upper portion and to the bottom edge of the keyboard. In another example embodiment described with respect to FIG. 4K, vertical walls 499 may surround the front edge of the touchpad surface panel 451, the left palm rest surface panel front edge 402*a*, the right palm rest surface panel front edge 403*a*, the left edge of the left palm rest surface panel 402, the right edge of the right palm rest surface panel 403, so as to form a tray for insertion of the left palm rest surface panel 402, the right palm rest surface panel 403, and the touchpad surface panel 451.

At block 614, the bottom surface of the touchpad support bracket may be further mounted to the upper portion of the base chassis via bottom-mounted front and rear screws. This may leave an RF-transparent zone within the base chassis in an embodiment. For example, in an embodiment described with respect to FIG. 4F, once the position of the touchpad surface panel with respect to the base chassis upper portion 440 has been finalized, the support bracket 455 of the haptic touchpad assembly (e.g., including the touchpad PCBA 420 and piezo actuator assemblies 426) may be operatively coupled such that they are mechanically fixed to the base chassis upper portion 440. This ensures that the touchpad surface panel remains aligned with the palm rest surface panels, the front boundary of the base chassis upper portion 440, and the front edge of the keyboard opening within the base chassis upper portion 440. The support bracket 455 may be operatively coupled to the base chassis upper portion 440 via a series of bottom-mounted fasteners inserted within threaded fastener openings 455*f* operably connected to the base chassis upper portion 440 following the insertion of the top-mounted side fasteners 461 and 462. The fastener openings 455*f* may be situated along the portions of the base chassis upper portion 440 nearest the support bracket rear edge 455*b* and the support bracket front edge 455*a*. These openings 455*f* may be threaded, to inhibit further movement of the support bracket 455 with respect to the base chassis upper portion 440 upon finalization of the location of the haptic touchpad assembly as described in greater detail herein.

As also described in an embodiment with respect to FIG. 4G, the support bracket 455 may be mounted to the base chassis upper portion 440 via a series of bottom-mounted fasteners (e.g., 481 and 483) inserted within threaded bushings 482 and 484, respectively, operably connected to the base chassis upper portion 440 in an embodiment. The threaded bushings 482 may comprise fastener openings (e.g., 455*f* of FIG. 4F) situated along the portions of the base chassis upper portion 440 nearest the support bracket rear edge 455*b*. The threaded bushings 484 may comprise fastener openings (e.g., 455*f* of FIG. 4F) situated along the portions of the base chassis upper portion 440 nearest the support bracket front edge 455*a*. These bushings 482 and 484, respectively, may be threaded, to inhibit further movement of the support bracket 455 with respect to the base chassis upper portion 440 upon finalization of the location of the haptic touchpad assembly as described in greater detail herein.

As described herein, because the polycarbonate impregnated composite substrate of woven glass fiber comprising the touchpad surface panel 451 has greater durability than traditional glass panels, the edges of the touchpad surface panel 451 may extend to the front edge or boundary of the base chassis upper portion 440, or to a metallic vertical wall forming the front edge of the base chassis upper portion 440 without encountering the durability concerns encountered when using a glass panel. For example, in an embodiment described with reference to FIG. 4I, although the top surface panel 451 of the haptic touchpad assembly may extend to the front edge of the base chassis upper portion 440 in an embodiment, underlying layers of the haptic touchpad assembly (e.g., lightguide layer 452, lightguide printed circuit board assembly (PCBA) 453, and support bracket 455) may be set back from the front edge of the base chassis upper portion 440 to provide an open area with an RF transparent window for insertion of a radiofrequency (RF) antenna. The support bracket 455, or touchpad PCBA 453 in an embodiment may cause interference or inhibit transmission of RF signals, while the touchpad surface panel 451 may be RF-transparent. Thus, the area where a portion of the touchpad surface panel 451 extends beyond the support bracket 455, the lightguide layer 452, and the touchpad PCBA 453 toward the front edge of the base chassis upper portion 440 may form one or more RF transparent zones 464.

At block 616, an RF antenna may be mechanically coupled or otherwise affixed to the upper portion of the base chassis such that a portion of the RF antenna is disposed directly beneath the RF-transparent zone in an embodiment. For example, in an embodiment described with respect to FIG. 4I, an RF antenna 463 in an embodiment may be mounted at least partially within or beneath this RF transparent zone 464. As also described in an embodiment with respect to FIG. 4J, the RF antenna 463 may be mounted beneath the support bracket 455 and extending at least partially beyond the support bracket 455 toward the front edge of the base chassis upper portion 440. For example, a portion of the RF antenna 463 may be situated beneath the RF-transparent zone (e.g., 464).

Many information handling systems employ a plurality of RF antennas (e.g., 463) for communication in more than one communication standard or frequency range (e.g., WWAN, WLAN, Bluetooth®, NFC). Placing plural antennas (e.g., including 463) nearby one another (e.g., both situated toward the rear of the base chassis upper portion 440) may increase interference between these antennas. Thus, there is a need to place antennas (e.g., 463) at other locations in an information handling system base chassis to provide improved antenna function. Further it is desirable in some embodiments to place additional antennas nearest the edges of the base chassis. Because the touchpad surface panel 451 in embodiment employs a polycarbonate impregnated composite substrate of woven glass fiber that is RF-transparent, antenna 463 or plural antennas may now be placed at an additional location on the front edge of the base chassis upper portion 440, located nearest the user. This may result in decreased interference between multiple antennas crowded at the back of an information handling system base chassis, or the ability to add an additional antenna not previously enclosed within the base chassis in conventional systems.

A keyboard may be mounted within the keyboard opening of the upper portion of the base chassis, and may include or otherwise be operably coupled to a PCBA in an embodiment at block 618. For example, in an embodiment described with respect to FIG. 4K, a keyboard 411 in an embodiment may be inserted within the keyboard opening 441 of the base chassis upper portion 440, then operably coupled to the touchpad printed circuit board assembly (PCBA) of the haptic touchpad assembly (e.g., as described above with respect to FIG. 2). The three-panel haptic touchpad and palm rest base chassis assembly in an embodiment may provide an aesthetically pleasing and durable three-panel upper surface with exterior edges defining the outer boundary of the base chassis upper portion 440. The three panels may be comprised of the same polycarbonate impregnated composite substrate of woven glass fiber in one embodiment that provides a glass-like texture and may allow for base chassis designs other than the windowed island of conventional base chasses. In other embodiments, an alternative material may be used for the palm rest panels and be supported by the base chassis upper portion. The touchpad surface panel 451 and both the right and left palm rest surface panels 402 and 403 neighboring the touchpad surface panel 451 may form the three panels, which may also extend away from the user toward the keyboard 411. Because a polycarbonate impregnated composite substrate of woven glass fiber has greater durability than traditional glass panels, the edges of the touchpad surface panel 451 and neighboring palm rests 402 and 403 may extend to the inserted keyboard as well as outer borders of the base chassis upper portion 440, such as to an aluminum band or other band as part of the upper portion of the base chassis without encountering the durability concerns encountered when using a glass panel. Further, the left and right palm rest surface panels 402 and 403 in an embodiment may be fixed to the base chassis upper portion 440 so as to conceal the top-mounted side screws used to fix the touchpad surface panel 451 to the base chassis upper portion 440. This design may provide a glass-like finish across the majority of the base chassis upper portion (e.g., the touchpad and palm rest surfaces) of uniform texture in some embodiments that extends to the front, left, and right outer boundaries of the base chassis upper portion and to the bottom edge of the keyboard.

At block 620, the upper portion of the base chassis may be operatively coupled or otherwise affixed to the bottom portion of the base chassis in an embodiment to enclose the RF antenna between the RF-transparent window portion of the bottom portion of the base chassis and the RF transparent zone created between the touchpad top cover and the upper portion of the base chassis in an embodiment. This may occur after communicative coupling of the touchpad and its PCBA to other components of the information handling system in the lower portion of the base chassis. For example, in an embodiment described with respect to FIG. 4K, the base chassis may include a lower portion or housing that may be joined to the base chassis upper portion 440 to enclose the components of the information handling system. In another example embodiment described with FIG. 4I, the RF antenna 463 in an embodiment may be mounted at least partially within or beneath this RF transparent zone 464, and may be enclosed within an RF-transparent base chassis lower portion 465 (e.g., comprising an RF-transparent plastic). In such a way, the three-panel haptic touchpad and palm rest base chassis assembly employing a polycarbonate impregnated composite substrate of woven glass fiber may extend the edges of the touchpad and neighboring palm rests to the keyboard as well as to outer borders of the base chassis, such as an aluminum or other band of the upper portion of the base chassis, without encountering the durability concerns encountered when using a glass panel, improve antenna signal strength, and minimize the manufacturing carbon footprint. The method for top-mounting a haptic touchpad assembly to a base chassis upper portion in alignment with palm rest surface panels to form a three-panel touchpad and palm rest base chassis assembly may then end.

The blocks of the flow diagram of FIGS. 5 and 6 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another may communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. A plural-panel touchpad and palm rest base chassis assembly for an information handling system comprising:
   a base chassis enclosing at least a portion of the information handling system;
   an upper portion of the base chassis including a keyboard opening, a palm rest support surface, and a touchpad opening for insertion of a touchpad assembly;
   the touchpad assembly including a touchpad surface panel, a touchpad printed circuit board assembly (PCBA), and a touchpad support bracket, wherein the touchpad surface panel comprises a unitary substrate of thermoplastic fiberglass composite that is impregnated with polycarbonate material and is radiofrequency (RF) transparent;
   the touchpad support bracket mechanically and operatively coupled to the base chassis upper portion via top-mounted fasteners disposed through openings along the sides of the touchpads support bracket and into the palm rest support surface;
   a palm rest surface panel, where the palm rest surface panel is disposed on top of the palm rest support surface and covering the top-mounted fasteners in a portion of the touchpad support bracket and includes a first side edge defining a side boundary of the base chassis upper portion, and a second side edge disposed adjacent to the touchpad surface panel; and
   the touchpad surface panel and the palm rest surface panel having a front edge defining a portion of a user-facing boundary of the base chassis upper portion and a rear edge forming a portion of the keyboard opening.

2. The plural-panel touchpad and palm rest assembly of claim 1 further comprising:
   the touchpad PCBA operably coupled to a capacitive sensor array sensing capacitive touch in the touchpad assembly underneath the touchpad surface panel.

3. The plural-panel touchpad and palm rest assembly of claim 1 further comprising:
   an antenna communicatively coupled to a network interface device of the information handling system disposed at least partially beneath the front edge of the touchpad surface panel.

4. The plural-panel touchpad and palm rest assembly of claim 1 further comprising:
   a piezoelectric device assembly for haptic user feedback disposed between the touchpad PCBA and the touchpad support bracket in the touchpad assembly.

5. The plural-panel touchpad and palm rest assembly of claim 1 further comprising:
   the touchpad support bracket mechanically and operatively coupled to the base chassis upper portion via bottom-mounted fasteners along a support bracket front edge and a support bracket rear edge defining an RF transparent window beneath a portion of the front edge of the touchpad surface panel for mounting an antenna.

6. The plural-panel touchpad and palm rest assembly of claim 1 further comprising:
   the touchpad assembly including a lightguide layer operatively coupled to a light emitting diode and disposed between the touchpad PCBA and the touchpad surface panel to light regions of the touchpad surface panel that are light transmissive to indicate touch button locations on the touchpad surface panel.

7. The plural-panel touchpad and palm rest assembly of claim 1, wherein the palm rest surface panel comprises a unitary composite substrate of woven glass fiber impregnated with polycarbonate material that is supported by the palm rest support surface.

* * * * *